(12) United States Patent
Kuzevanov

(10) Patent No.: US 10,422,413 B2
(45) Date of Patent: Sep. 24, 2019

(54) PLANETARY GEAR TRAIN

(71) Applicant: Gai Viktorovich Kuzevanov, Chelyabinsk (RU)

(72) Inventor: Gai Viktorovich Kuzevanov, Chelyabinsk (RU)

( * ) Notice: Subject to any disclaimer, the term of this patent is extended or adjusted under 35 U.S.C. 154(b) by 0 days.

(21) Appl. No.: 15/518,685

(22) PCT Filed: Oct. 12, 2015

(86) PCT No.: PCT/RU2015/000650
§ 371 (c)(1),
(2) Date: Apr. 12, 2017

(87) PCT Pub. No.: WO2016/060589
PCT Pub. Date: Apr. 21, 2016

(65) Prior Publication Data
US 2017/0227092 A1 Aug. 10, 2017

(30) Foreign Application Priority Data

Oct. 13, 2014 (RU) ................................ 2014141179

(51) Int. Cl.
*F16H 1/28* (2006.01)
*F16H 1/48* (2006.01)
(Continued)

(52) U.S. Cl.
CPC ............. *F16H 1/2836* (2013.01); *F16H 1/28* (2013.01); *F16H 1/2809* (2013.01); *F16H 1/48* (2013.01);
(Continued)

(58) Field of Classification Search
CPC .. F16H 1/2836; F16H 57/082; F16H 25/2454; F16H 2035/005; F16H 1/28;
(Continued)

(56) References Cited

U.S. PATENT DOCUMENTS

| 4,369,674 A | 1/1983 | Hamane et al. |
| 2007/0281822 A1* | 12/2007 | Maier ................... B25B 21/00 475/286 |

(Continued)

FOREIGN PATENT DOCUMENTS

| GB | 2195002 | 3/1988 |
| RU | 2037695 | 6/1995 |

(Continued)

*Primary Examiner* — Jeffrey A Shapiro
(74) *Attorney, Agent, or Firm* — Aleksandr Smushkovich

(57) ABSTRACT

A planetary gear train includes a central wheel, a gear and a carrier, geometrically coupled by a closed eccentric connection that locks the gear. The locking is provided by displacement of the carrier in relation to the gear in a circumferential or tangential direction, when the gear's rotation speed is lower than the carrier's rotation speed. When there is more than one locking gear, the carrier's displacement in relation to the gear can be identical or different. The eccentric connection can be designed as an eccentrically disposed projecting section of outer surface of either the gear or the carrier, conjugated with an opening or slot formed in the carrier or gear, or as an eccentric element having eccentrically disposed projecting sections that may be designed as a single rolling body. The gear train provides for locking (blocking) the gear, as well as for transmitting rotational movement thereby extending its use.

3 Claims, 28 Drawing Sheets

(51) Int. Cl.
*F16H 57/08* (2006.01)
*F16H 35/00* (2006.01)

(52) U.S. Cl.
CPC ........... *F16H 57/08* (2013.01); *F16H 57/082* (2013.01); *F16H 2035/001* (2013.01)

(58) Field of Classification Search
CPC . F16H 1/32; F16H 1/48; F16H 1/2809; F16H 29/00; F16H 29/04; F16H 29/06; F16H 57/08; F16H 57/021; F16H 57/0031; F16H 2001/321; F16H 2001/323; F16H 2001/324; F16H 2001/325; F16H 2001/326; F16H 2001/327; F16H 2035/001; F16H 2035/003
USPC ................................ 475/346, 900, 162, 163
See application file for complete search history.

(56) References Cited

U.S. PATENT DOCUMENTS

2014/0024489 A1* 1/2014 Heber .................... B25B 21/00 475/299
2016/0061297 A1* 3/2016 Lindstrom ............... B60K 1/02 475/5

FOREIGN PATENT DOCUMENTS

RU 2444658 3/2012
RU 2522185 7/2014

* cited by examiner

FIG. 1.1

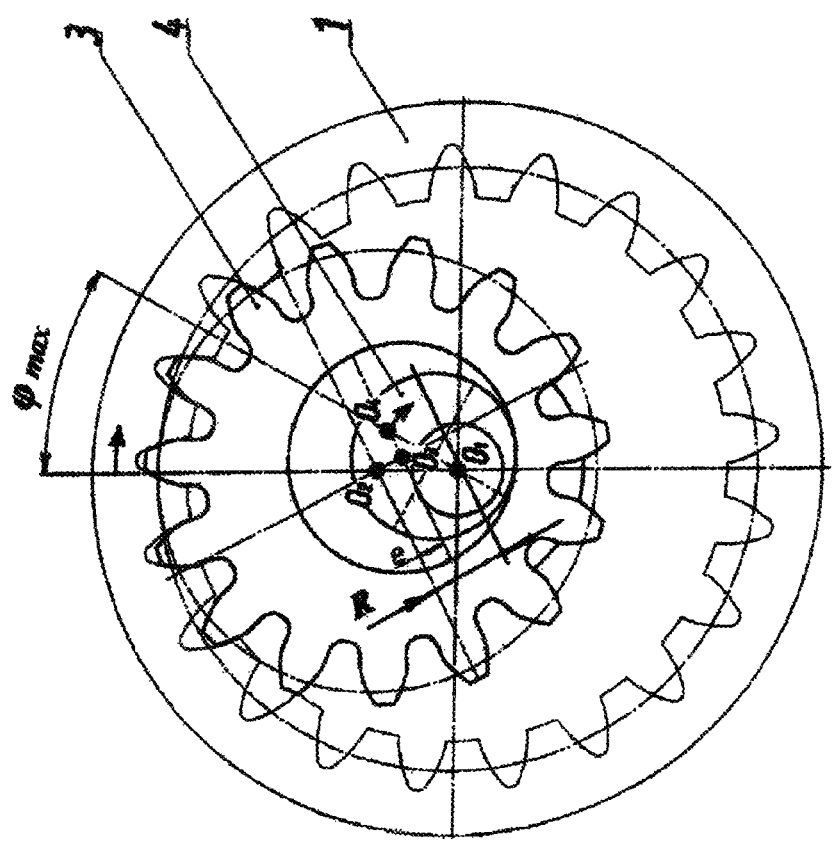
FIG. 1.2

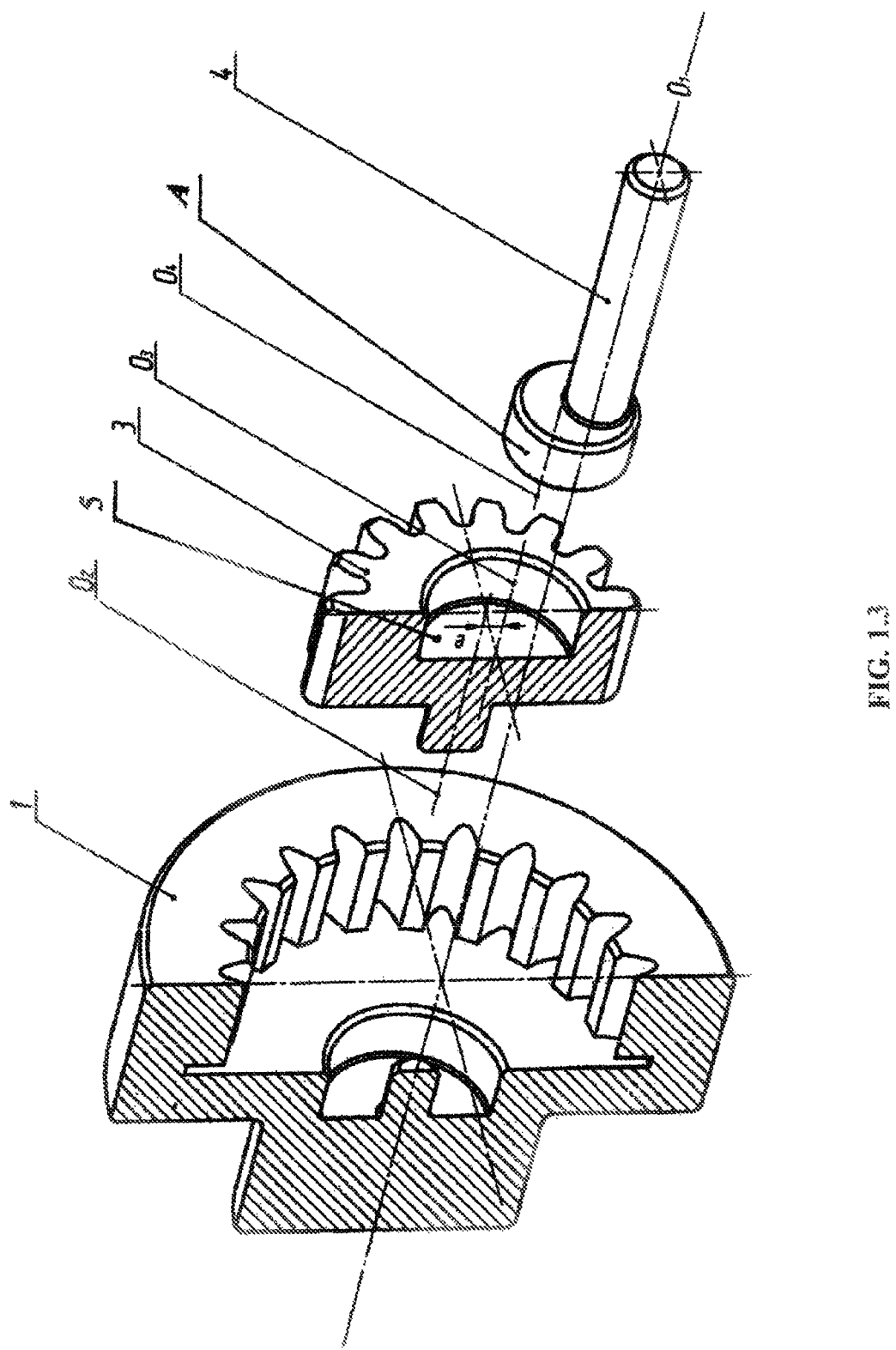
FIG. 1.3

FIG. 3.1

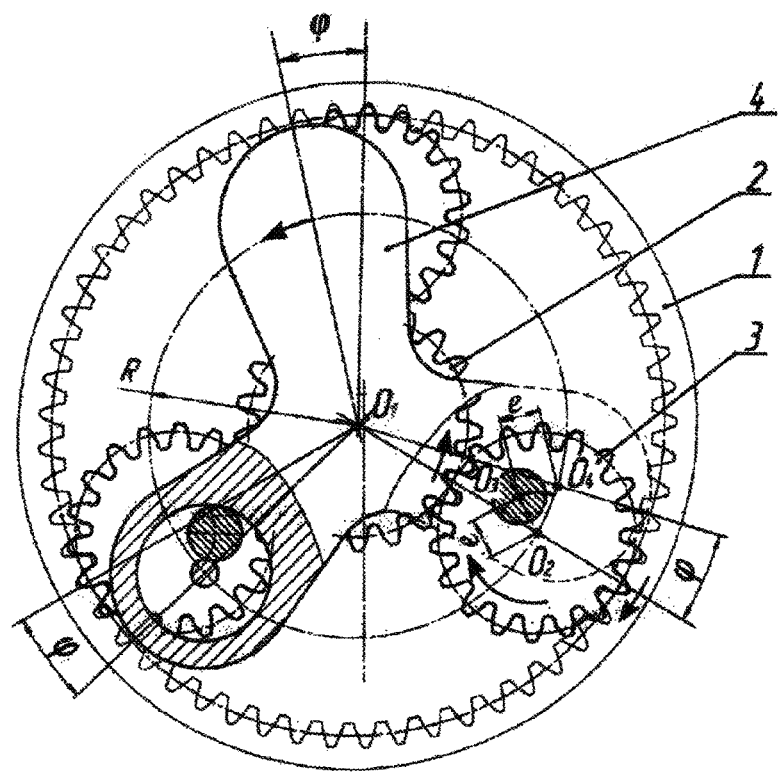
FIG. 3.2
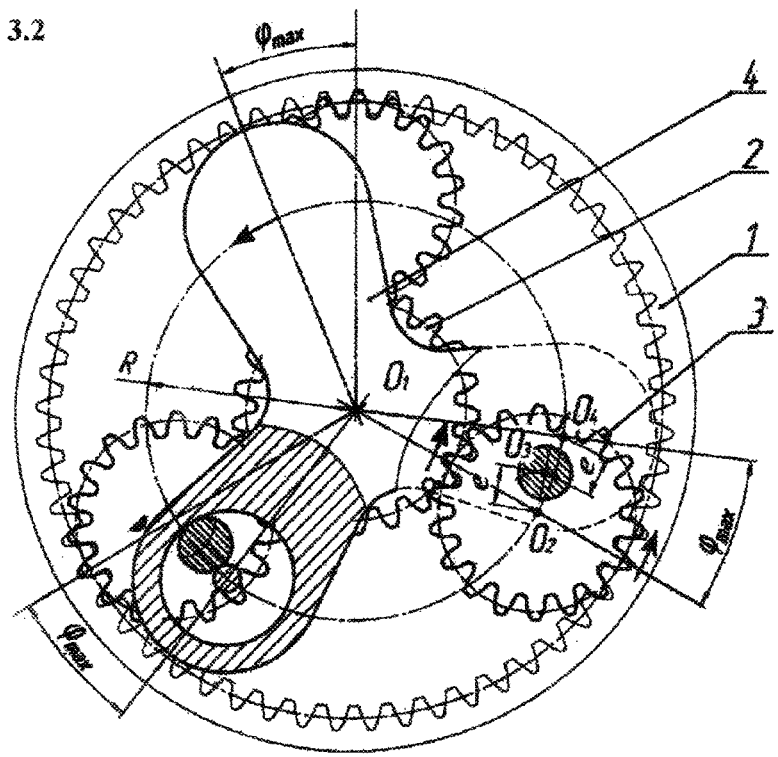
FIG. 3.3

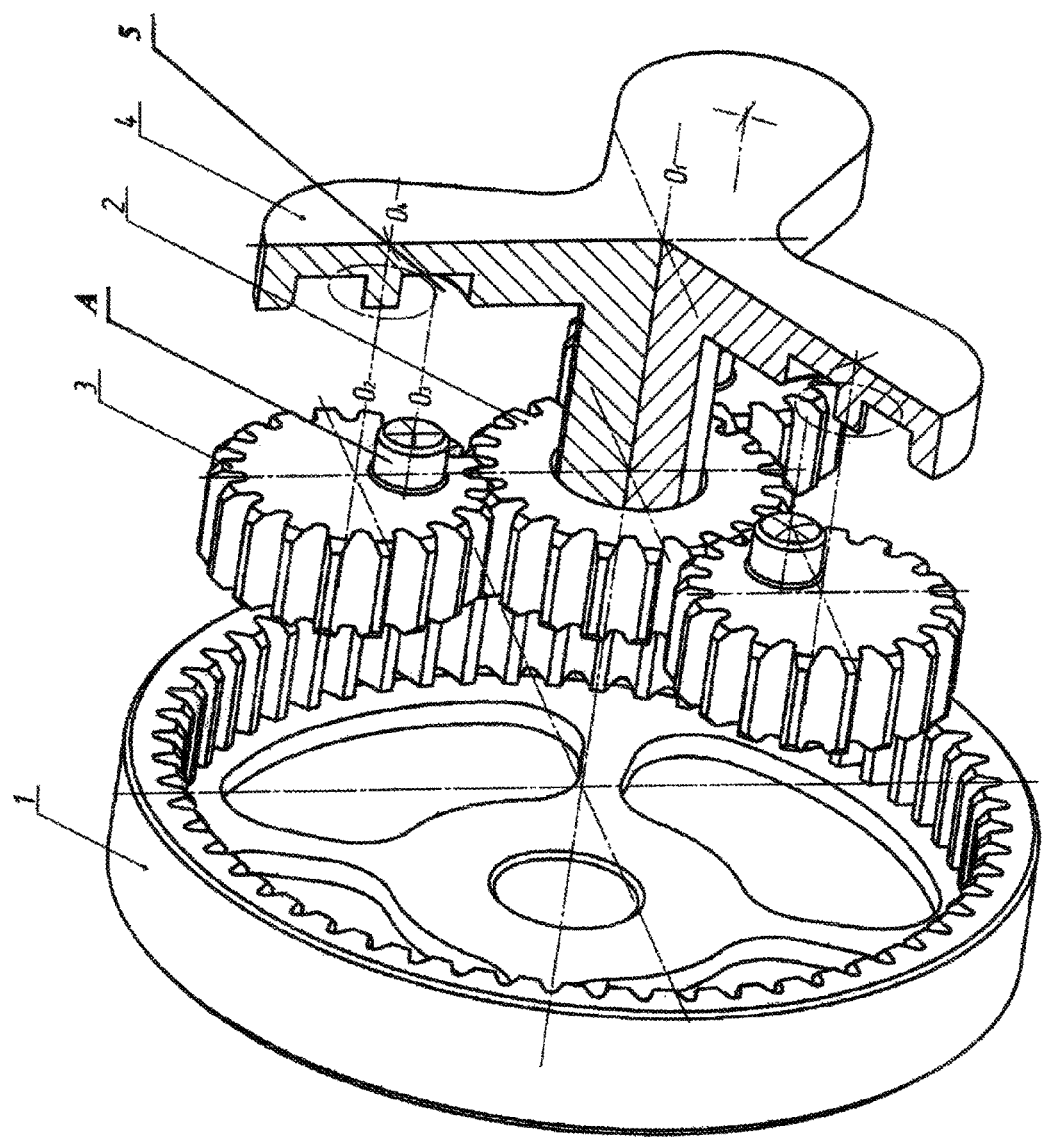
FIG. 3.4

FIG. 4.1

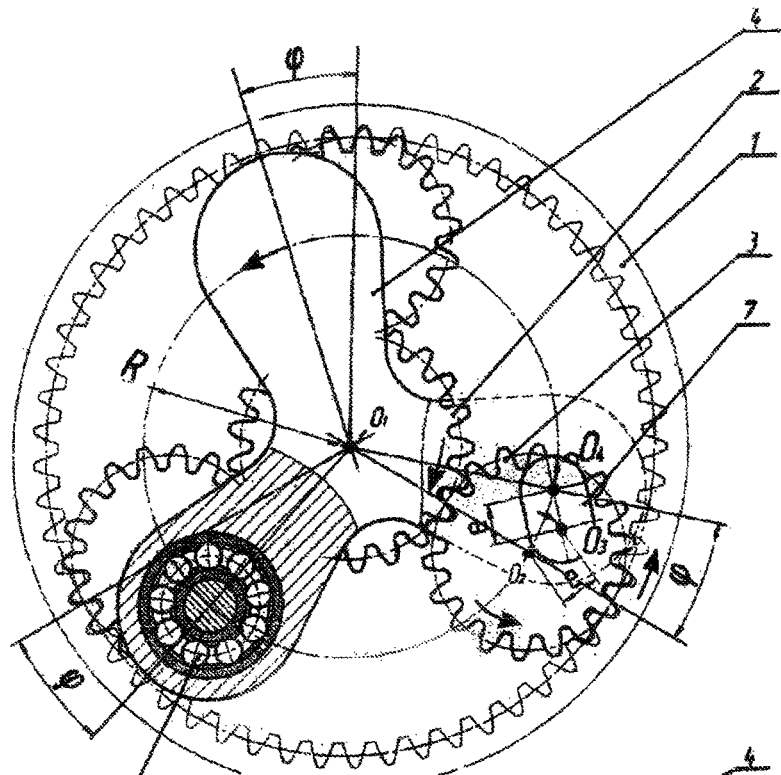
FIG. 4.2
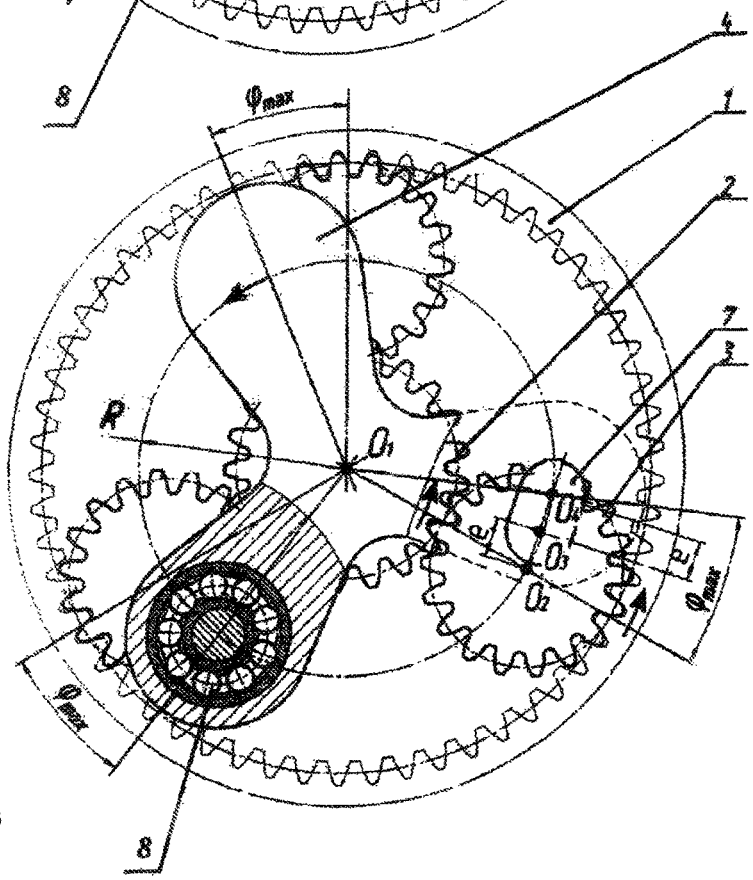
FIG. 4.3

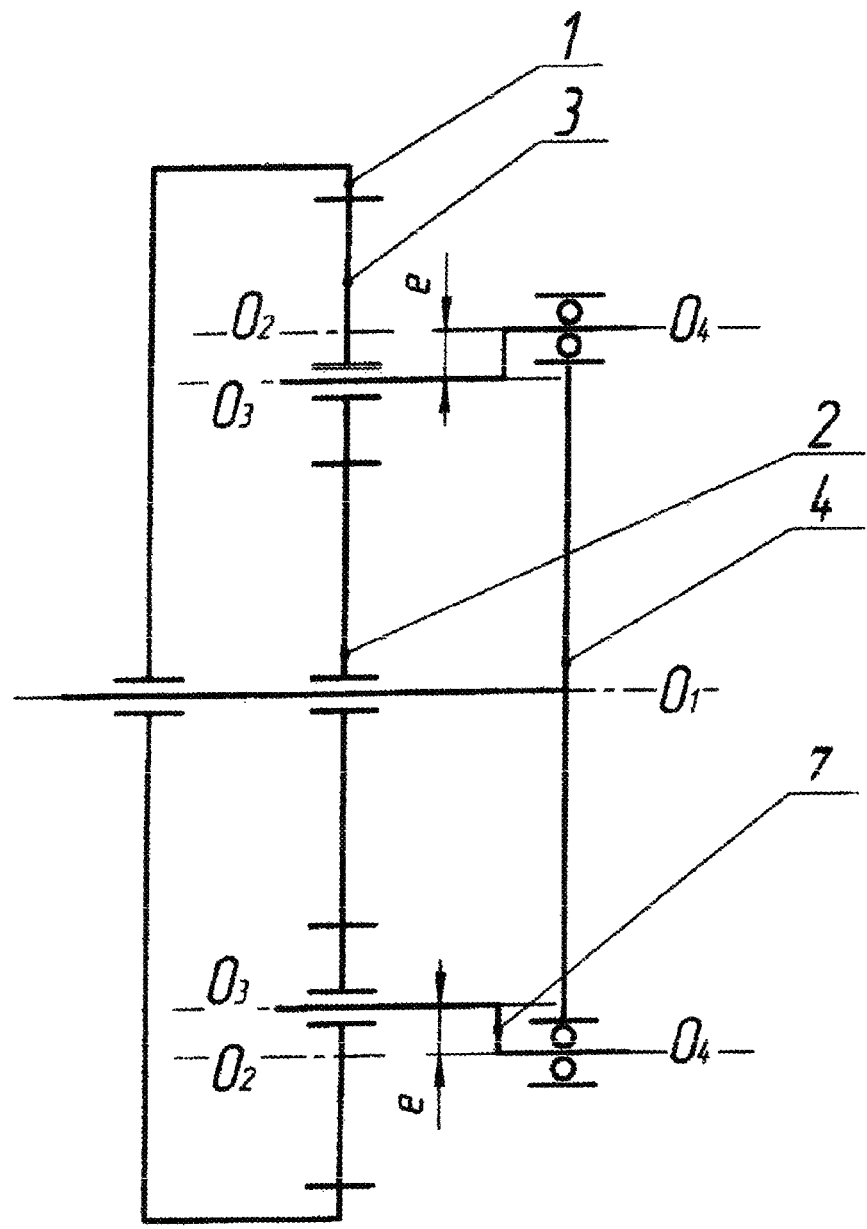
FIG. 4.4

FIG. 5.1

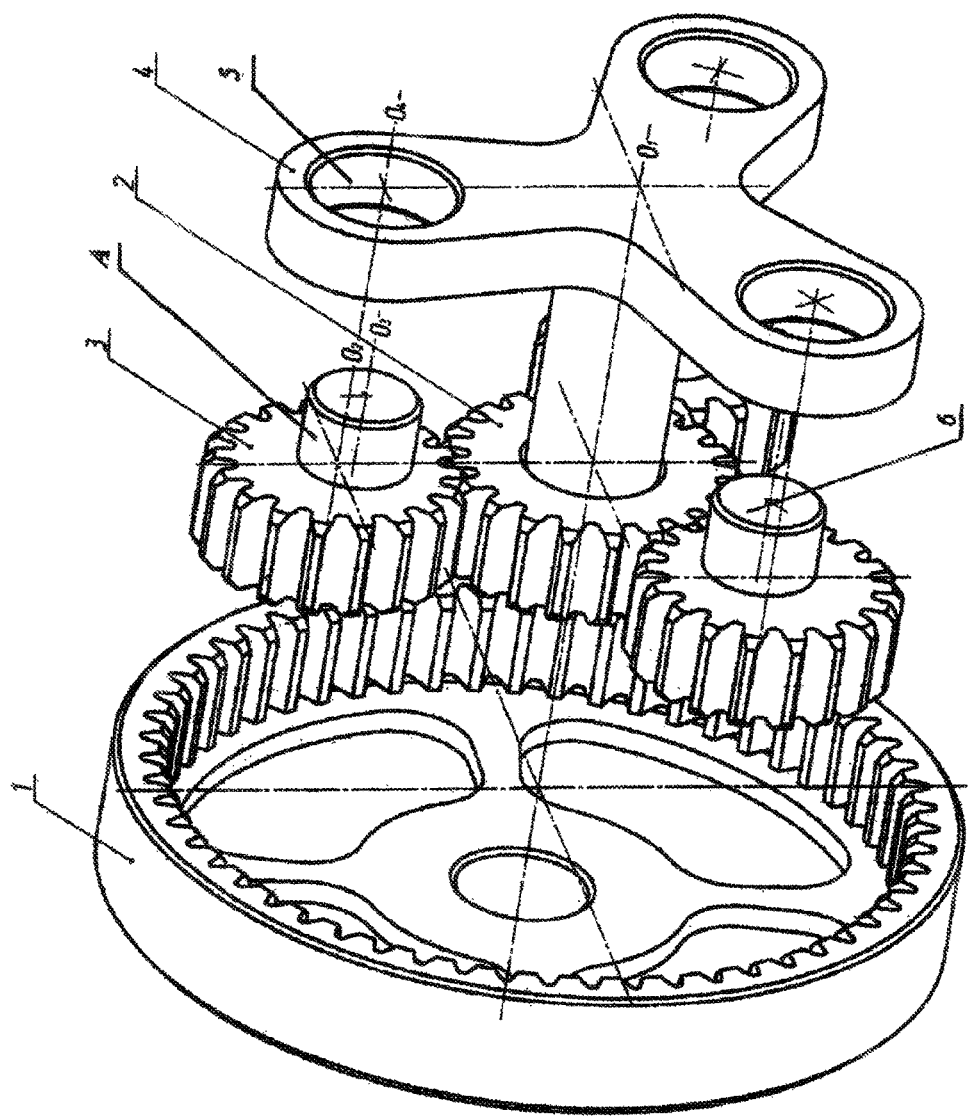
FIG. 5.2

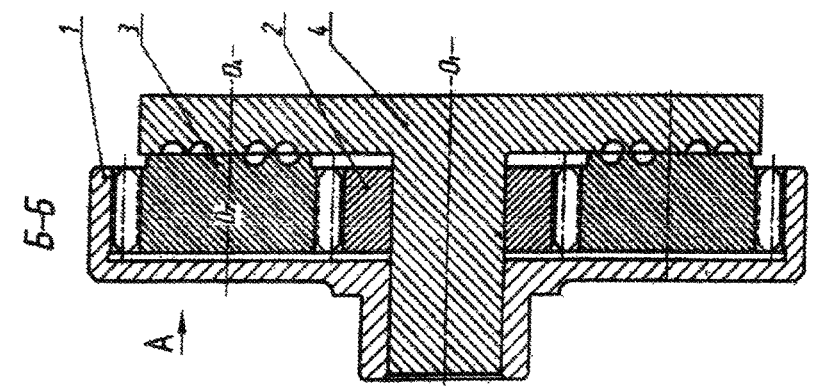
FIG. 7.2
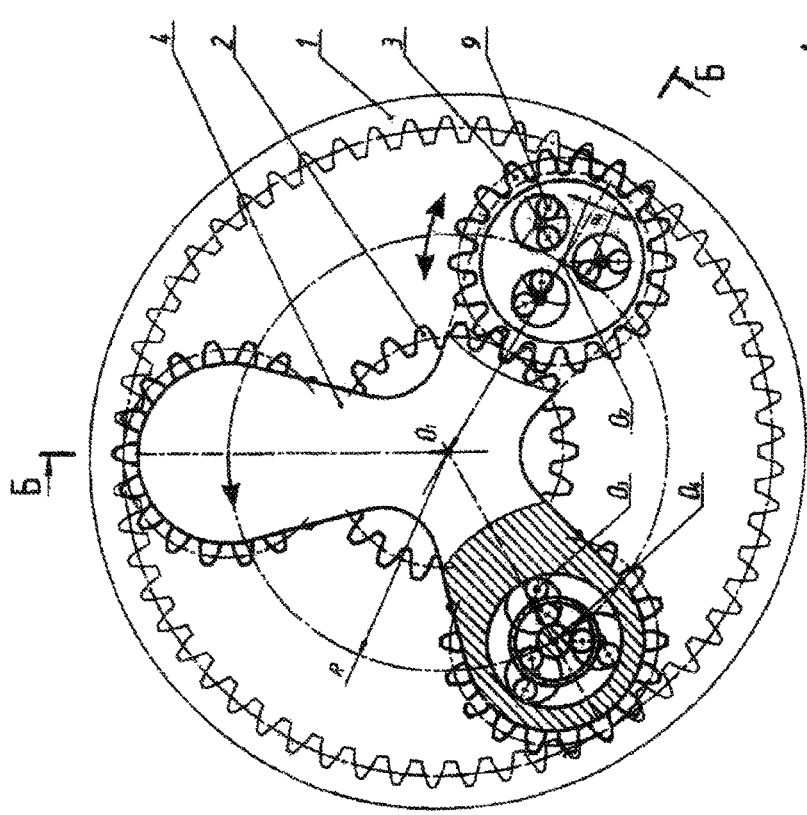
FIG. 7
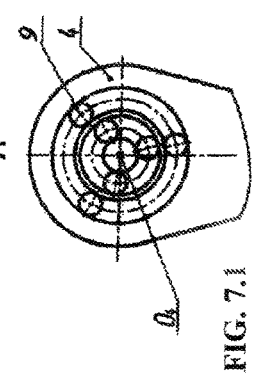
FIG. 7.1

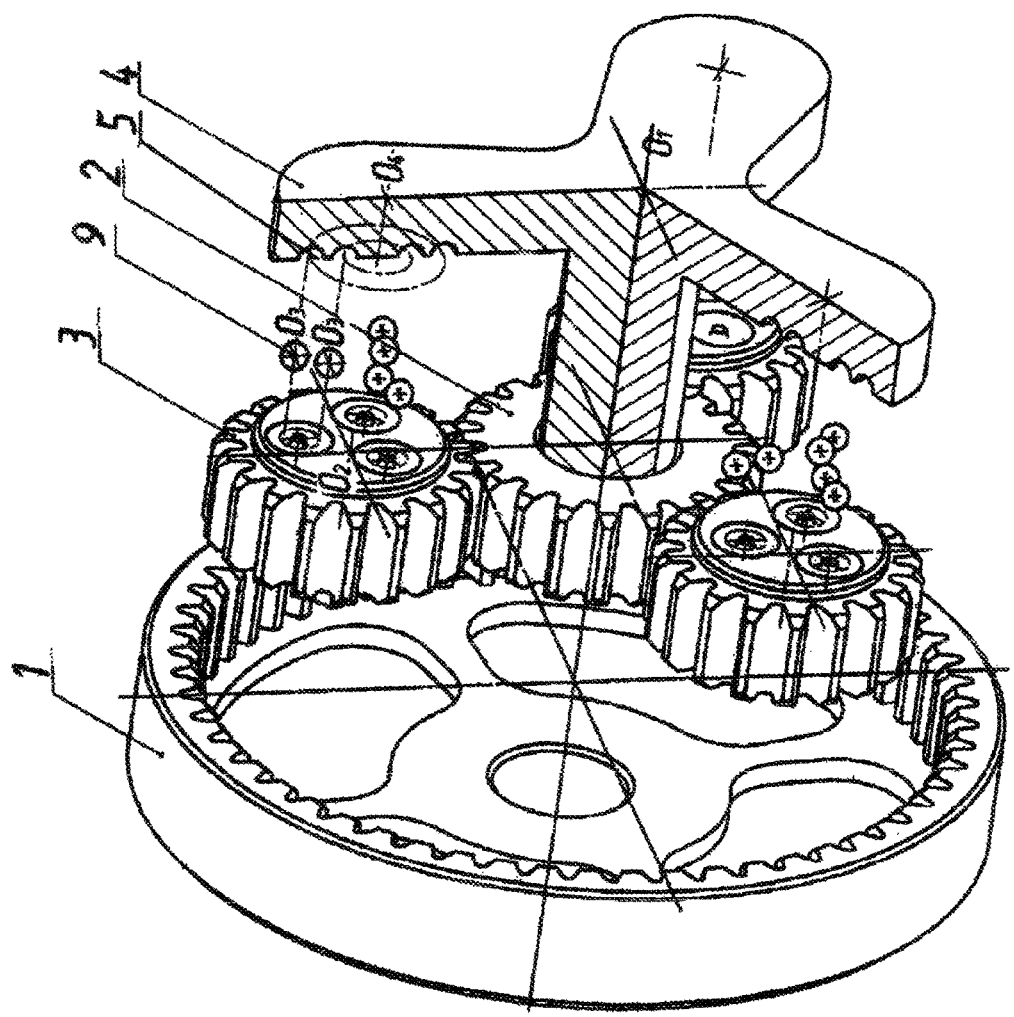
FIG. 7.3

FIG. 9.1

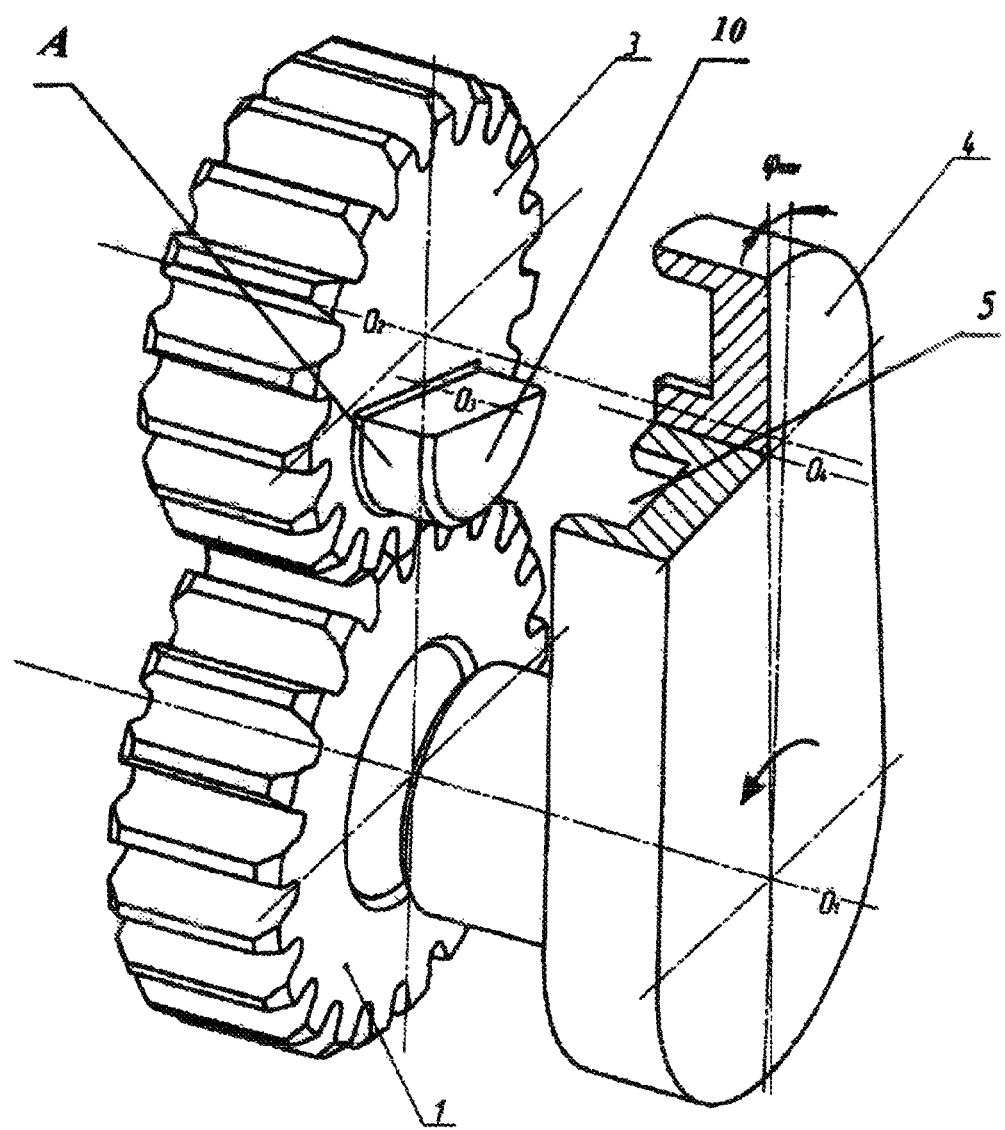
FIG. 9.2

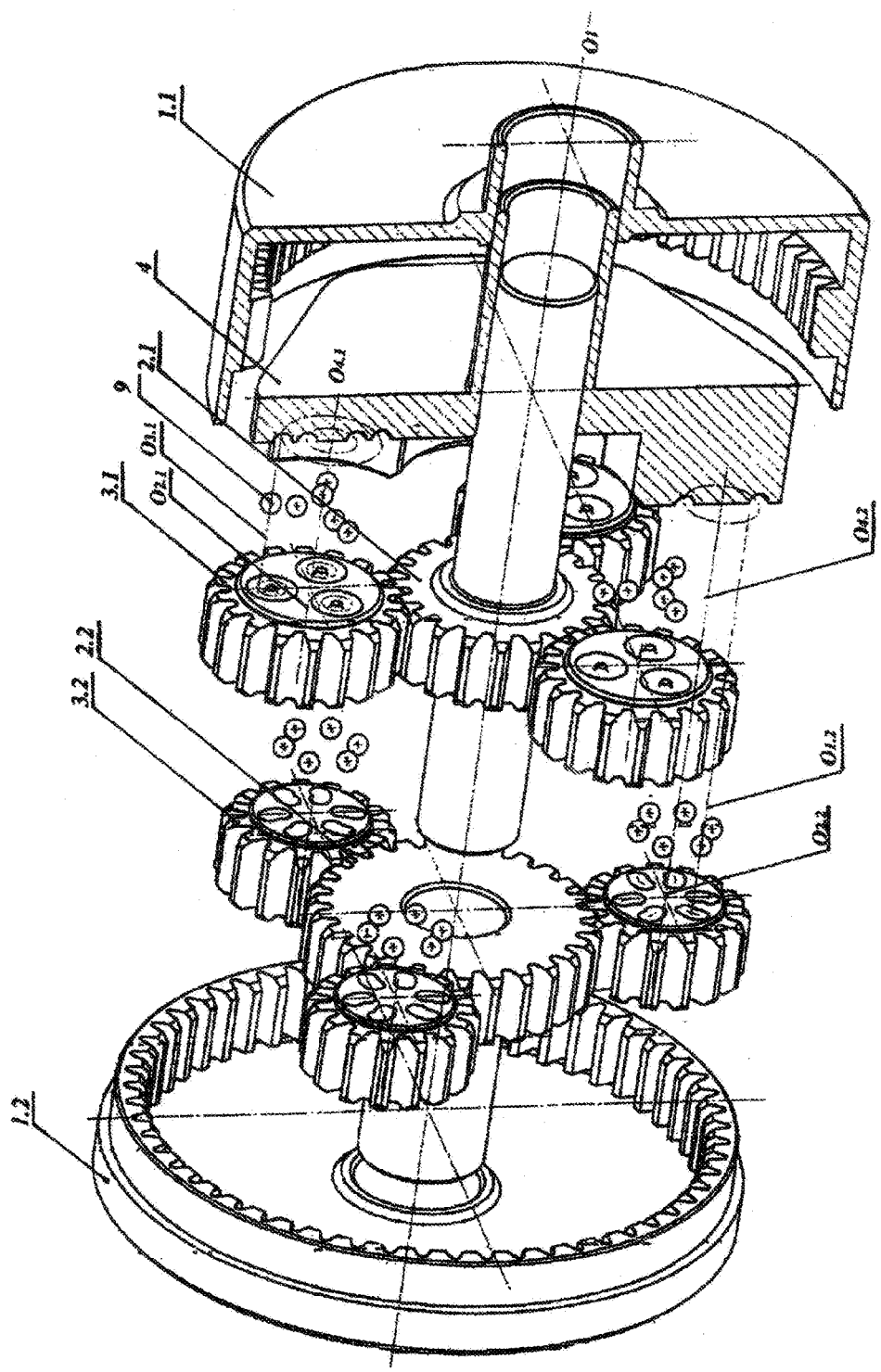
FIG. 14.4

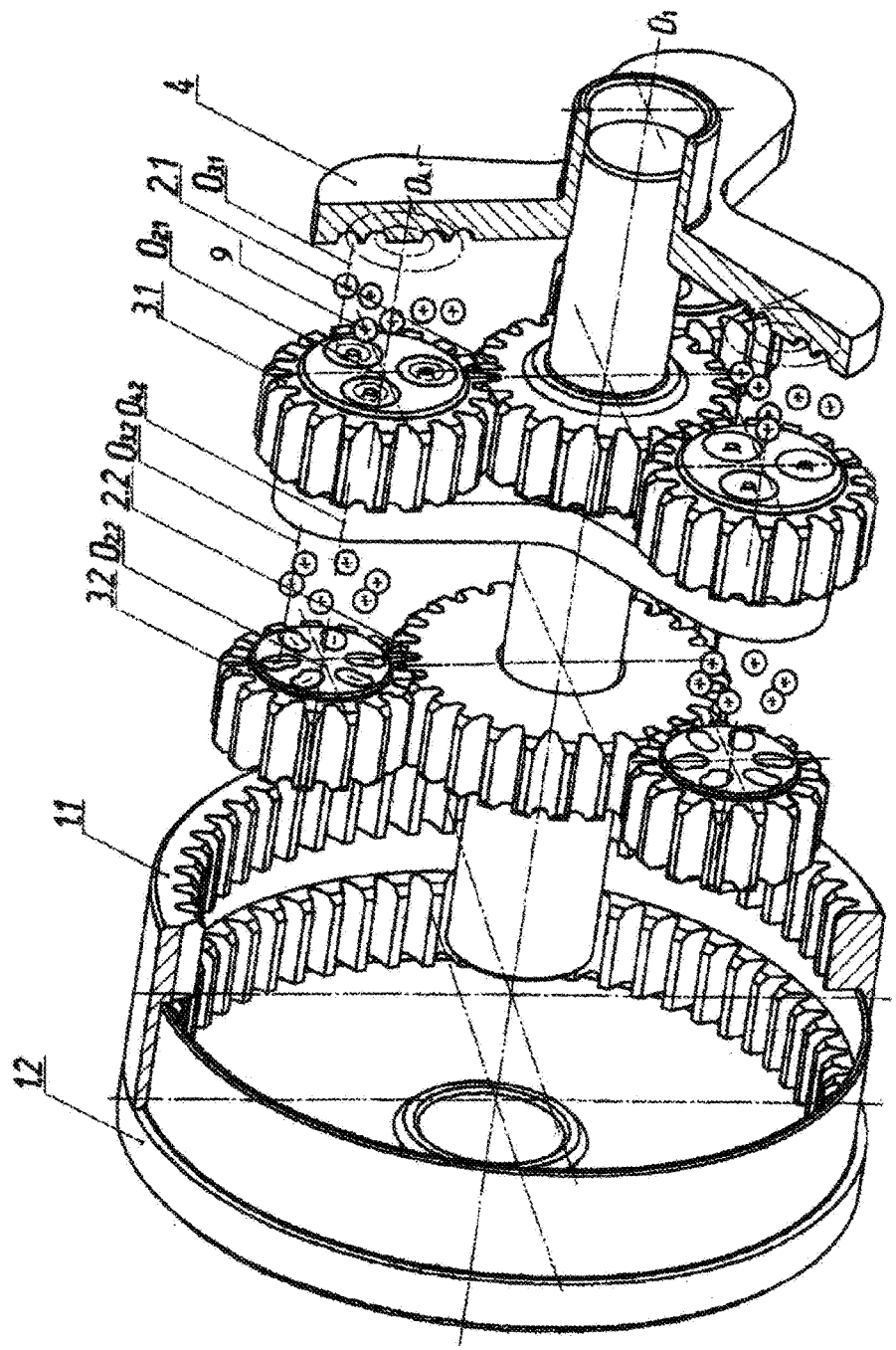
FIG. 15.4

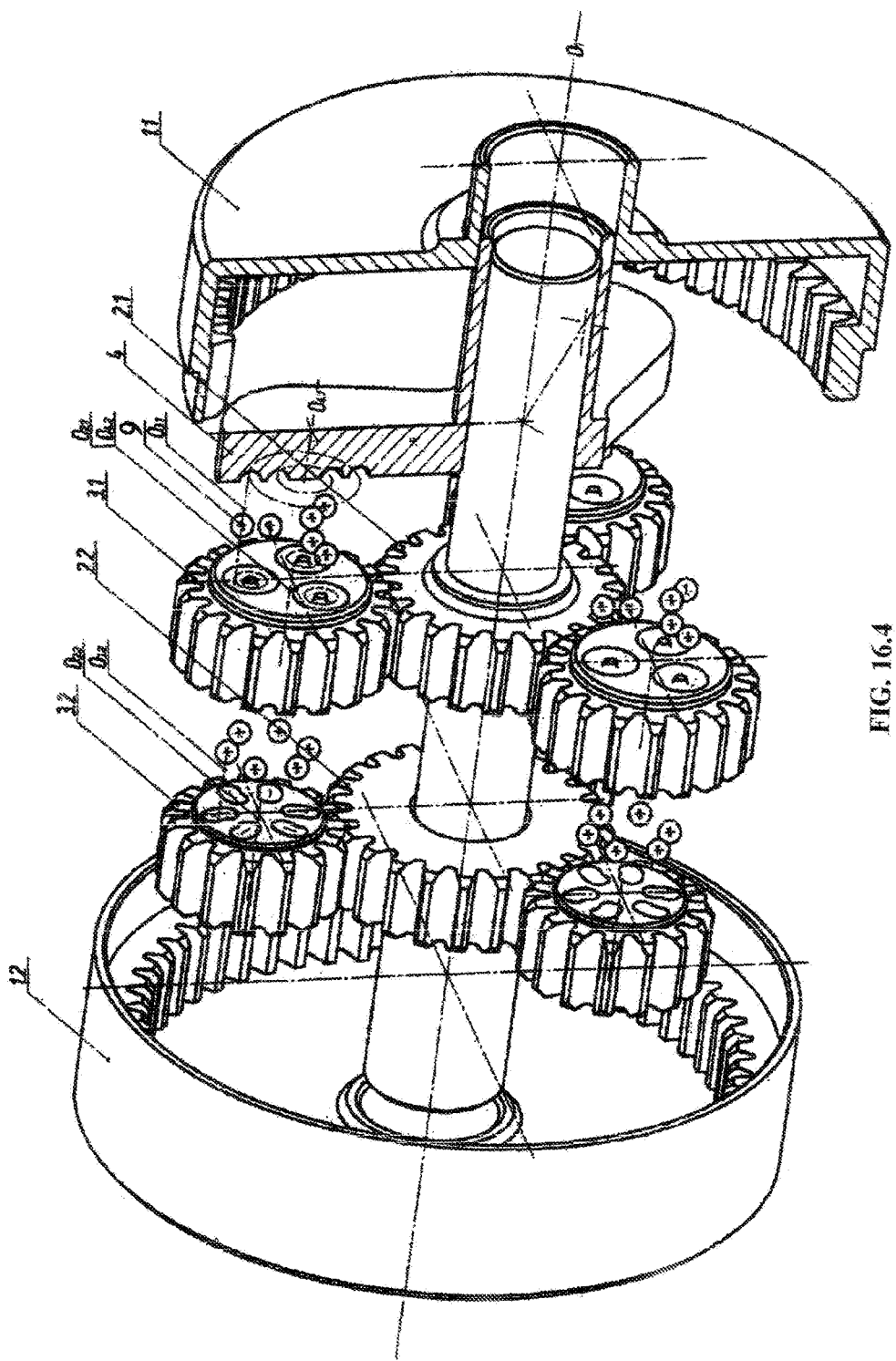
FIG. 16.4

PLANETARY GEAR TRAIN

CROSS-REFERENCE TO RELATED APPLICATIONS

This application is a U.S. national stage application of a PCT application PCT/RU2015/000650 filed on 12 Oct. 2015, published as WO/2016/060589, whose disclosure is incorporated herein in its entirety by reference, which PCT application claims priority of a Russian Federation application RU2014141179 filed on 13 Oct. 2014.

FIELD OF INVENTION

The invention relates to machine industry, particularly to epicyclical (planetary) gears, and can be used in freewheel clutch, automatic transmissions, vehicle, cycling and motor transmission, in electric and petrol-powered tool gears, in epicyclical reduction gears, as well as in all sectors of national economy.

BACKGROUND OF THE INVENTION

There is known an epicyclical gear train which comprises center wheels, carrier, satellites, installed on carrier studs through bearings. Moreover, satellites and studs are installed with a set eccentricity, and the bearings are concentric to carrier studs, and the outer bearing diameter is smaller than the internal diameter of satellite by a double eccentricity amount, and the studs' axes are offset from the satellites by an eccentricity value (referring to Patent RU2398145, IPC. F16H 1/48, published on 27 Aug. 2010).

The problem to be solved by this known device is to improve the epicyclical gear train by eliminating a load imbalance and uneven wear of the gear elements work surfaces.

However, in heavily loaded gears cantilever mounting of the satellite on the carrier's studs leads to significant stud bending and uneven distribution of load along satellite's tooth, inside and off-side center wheels, and as a result, to damage of the interacting teeth edges of the center wheels and satellites, and the contact between bearing rolling elements and stud's surface in a limited area (in area of active forces applied) leads to only part wear of the stud's surface-working area, and stud's area, opposite to the forces applied, remains unworn, which leads to uneven wear of the carrier and its life reduction.

The epicyclical (planetary) gear train which was chosen as the closest analogue and contains center wheels, carrier, satellites, installed on shaft with bearings. Moreover, satellites and shafts are installed with set eccentricity, and satellites are installed on the shafts, ends of which are placed in carrier's body on the bearings, concentric with the shafts, and upon that outer diameter of shaft's working part, on which satellites are placed and with which they interact, is smaller than internal diameter of satellite by the double eccentricity amount, and shafts' axes are displaced from satellites' axes by the set eccentricity value (referring to Patent RU2444658, IPC. F16H 1/48, published on 10 Mar. 2012).

In this implementation of the well-known epicyclical gear train, the shaft deformation is symmetrical relatively to carrier's body parts and doesn't lead to misalignment of the satellite axes relatively to the axes of center gear wheels. Wear of the shaft outer surface, which interacts with satellite internal diameter, is uniform, since satellite makes not only hobbling motions towards the shaft, but roll motions as well, and bearings work as in usual gear box.

However, the known design is aimed only at elimination of uneven load of the elements, transmits only rotation motion and cannot stop at least one satellite, i.e. blocks it, that reduces its functionality significantly, and as a result narrows the range of its application.

SUMMARY OF THE INVENTION

Therefore, the technical result, which the claimed invention is directed at is to create an epicyclical gear train of a new type, with advanced functional, operating and technological capabilities for a broad class of vehicles and devices, which provides for braking (blocking) of the epicyclical gear in addition to transmitting rotational motion, that in turn extends the range of practical application significantly, while the epicyclical gear still ensures balanced load of the satellites, eventually increasing the work resource of the epicyclical gear.

This technical result is achieved by the fact that in the epicyclical gear train, which comprises at least one center wheel on its axis, which forms rolling gear with at least one satellite, which freely runs on its rotation axis and is conjugated with the carrier by at least one geometrically closed eccentric connection allowing displacement of the carrier relatively to the rotation axis of at least one satellite, according to the invention, at least one geometrically closed eccentric connection conjugating carrier and at least one satellite is configured to brake at least one said satellite.

Moreover, the braking of at least one satellite is provided by the carrier displacement relatively to at least one satellite rotation axis in the circumferential or tangential direction by at least one geometrically closed eccentric connection of this conjugation.

In this case, the carrier displacement amount may be the same or different relatively to each of braking satellites rotation axis, when the number of satellites is more than one.

Also, the braking of at least one of the satellites is provided when its rotation rate is lower than the carrier's rotation rate.

There is at least one basic geometric axis, located on the carrier, for each satellite in order to provide the satellite free rotation if there is the axis' alignment with this braking satellite's rotation axis (i.e. when the two axes coincide).

Moreover, the distance from the braking satellite's rotation axis to the gear axis is constant and equal to the distance from the gear axis to the at least one basic geometrical axis on the carrier of this conjugation. However, when the number of braking satellites is more than one, the distance between the axes, given above, of each of the braking satellites can be the same or different from a similar distance of other braking satellites, while remaining equal to the distance from the gear axis to the basic geometrical axis on the carrier of this conjugation.

In the claimed epicyclical gear at least one geometrically closed eccentric connection may be made in the form of protruding portion of the satellite's outer surface, eccentrically located on the at least one satellite and conjugated with the hole or slot on the carrier; or in the form of hole or slot, eccentrically located on the at least one satellite and conjugated with the protruding part of outer surface on the carrier; or in the form of an eccentric element with the protruding part of its outer surface and/or holes and/or slots, placed eccentrically relatively to each other, conjugated with the carrier and the at least one satellite by holes and/or slots and/or protruding parts of the outer surface, located on the satellite and the carrier respectively.

Moreover, the protruding part of the outer surface of at least one geometrically closed eccentric connection may be made in the form of at least one rolling element.

Moreover, at least one geometrically closed eccentric connection may be made with the possibility of displacement relatively to the gear axis.

The claimed epicyclical gear can be made as differential; or it can be made as a complex and/or multilink.

In the claimed epicyclical gear, at least one satellite of one planetary gear set can be conjugated as/or with the carrier, as/or with the center wheel, as/or with at least one satellite of another planetary gear set, by geometrically closed eccentric connection.

Availability of the braking option in the claimed epicyclical gear train by braking at least one of its satellites, carried out with at least one geometrically closed eccentric connection, which permanently conjugates the carrier and the at least one satellite, allows extending its functional and operating capabilities significantly. This is achieved by the fact that the claimed design of the epicyclical gear, in addition to its main function, which is a transmission of rotation motion, also ensures its braking (blocking). Moreover, the claimed device provides for full balancing the satellites' load of the planetary device as well.

Availability of the braking option of the at least one satellite through the carrier's displacement relatively to the satellite's rotation axis exactly in a circumferential or tangential directions by at least one geometrically closed eccentric connection of this conjugation allows extending its functional, operating, and technological capabilities of claimed epicyclical gear even more.

This is achieved by a capability of the gear not to lose efficiency if there are displacements in the conjugated parts, but rather to use this technological capability to additionally provide for braking (blocking) the satellite. Thus, the implementation of the inventive epicyclical gear with the possibility of the carrier's displacement relatively to the rotation axis of at least one satellite in the circumferential or tangential directions, provides the necessary efficiency of the claimed epicyclical gear since kinematic connections in the gear's links are provided only in these displacement directions. In other options of the carrier displacement relatively to the rotation axis of the at least one satellite, e.g. during the radial displacement, the gear will lose efficiency in connection with the loss of kinematic connections in its links.

The possibility to implement the carrier's displacement relatively to the rotation axis of each of the braking satellites as the same or different, when the number of satellites is more than one, also allows the use of eccentric geometrically closed connection with different eccentricity in the epicyclical gear, that will provide a uniform load of the teeth, and smooth or partial braking the inventive epicyclical gear.

The possibility of at least one satellite braking when its rotation rate is lower than the carrier's rotation rate, is the one which provides the achievement of specified technical result, because only in this case it is possible to provide the carrier's displacement relatively to the satellite rotation axis, which provides the braking of the at least one satellite. This also allows expanding operational capabilities of the epicyclical gear by using it in overrunning clutches.

At least one of the basic geometric axis located on the carrier for each braking satellite, which provides the braking satellite with free rotation during this basic geometric axis alignment with this satellite rotation axis, also contributes to the achievement of the claimed technical result, in particular to provide gear's main functions—the transmission of rotational motion, and, moreover, providing the gear with wide range of gear ratio. This can be explained by the fact, that if the above-mentioned axes align during operating, the position of the braking satellite rotation axis is provided relatively to the carrier, which is appropriate for a basic installation of the satellite rotation axis on the carrier, providing free rotation of the satellite in standard designs of epicyclical gears.

Moreover, this can be achieved only under the condition that a distance from the at least one basic geometrical axis of the carrier to the gear axis is constant and equal to the distance from the gear axis to the satellite rotation, or, when the number of braking satellites is more than one, the distance between the above-mentioned axes of each of braking satellites can be the same or different from similar distances of other braking satellites, while remaining equal to the distance from the gear axis to the basic geometric axis on the carrier of its conjugation.

This is connected with the fact that the observance of these terms provides the kinematic connections and the design capability of the claimed epicyclical gear braking in the epicyclical gear links, since the gear will lose efficiency with inconstant values for these distances due to loss of kinematic connections in the gear links.

The implementation of the at least one geometrically closed eccentric connection in the form of protruding part of the outer surface, eccentrically located on the at least one satellite and conjugated with the hole or slot on the carrier, or the implementation of at least one geometrically closed eccentric connection in the form of the hole or the slot, eccentrically located on at least one satellite and conjugated with protruding part of outer space on the carrier, allows reducing its size due to assembly's simplicity and cost-efficiency of the claimed epicyclical gear and ensuring the interchangeability of structural elements, to simplify installation, and, consequently, increasing the manufacturability of the design, and, at the same time, providing a greater transmission capacity due to the uniform load of satellites.

This is achieved through using minimum number of parts to be joined in the design, with their assembly and disassembly simplicity, which increases the maintainability of the claimed design and, as a consequence, its manufacturability.

The implementation of at least one geometrically closed eccentric connection in the form of an eccentric element with protruding part of its outer surface and/or holes and/or slots, placed eccentrically relatively to each other, conjugated with a carrier and at least one satellite by holes and/or slots and/or protruding parts of the outer surface, located on the satellite and the carrier respectively, allows achieving the claimed technical result to a greater extent.

So, in this case, the improvement of the design manufacturability is achieved by significant simplicity of this unit assembly and simple repair process. This is due to the fact that the claimed eccentric element being a separate piece, provides greater operational functionality during the design installation, and also improves the maintainability of the finished product due to the possibility of quick replacement of parts in case of their failure. Thus, despite of some increase in size, this implementation of the claimed gear transmission is simple.

The implementation of the protruding part of the outer surface of at least one geometrically closed eccentric connection in the form of at least one rolling element, allows extending the functionality of the claimed gear as well. This is due to the fact that gears with rolling elements in the form of balls have a high bearing capacity. The epicyclical gears with rolling elements have high reliability, they are simpler than tooth gears and smaller in size for equivalent loads and gear ratios due to replacement of sliding friction with rolling friction in them. And, despite of the necessity of high accuracy while manufacturing parts for this gear type, taking into account the fact that at the present time the manufacture of these structural elements does not cause difficulties while manufacturing them with the computer controlled machines (CNC), this gear should be most applicable, as it has a high linking coefficient, low torque loss and minimal wear. This embodiment of the eccentric connection actually makes it possible to perform the transfer in the form of a gear-bearing.

The implementation of the epicyclical gear, which has at least one geometrically closed eccentric connection made with displacement possibility relatively to the gear axis, provides the achievement of the claimed technical result, i.e., significantly improves its performance and functional characteristics due to the increase of the durability, braking smoothness, and the increase of transmitted torque with a smaller size.

The configuration of the claimed epicyclical gear as differential significantly expands the applicability of the claimed design, i.e., significantly extends the functional and operational characteristics of the claimed device.

The configuration of the epicyclical gear as multilink allows increasing its functionality significantly. This is achieved by allowing multilink gear sequentially in separate steps (separate planetary gear set) to change the gear ratio, resulting in the desired gear ratio, and by the ability to change the rotation direction. This is achieved by the fact that there is a possibility of conjugation between at least one satellite and/or the carrier and/or with the center wheel and/or at least one satellite of another planetary gear set, by at least one geometrically closed eccentric connection. While such gears operate, the center wheel and/or at least one satellite of one planetary gear set become the carrier for at least one the satellite of another planetary gear set, which in its turn can be a carrier for the subsequent planetary gear sets, which allows extending the functionality of the claimed epicyclical gear significantly.

The configuration of the claimed epicyclical gear as a complex contributes to extending the range of its performance characteristics. So, in the case of a complex epicyclical gear configuration, which comprises composite satellites, it allows the transmission with several center wheels and the power selection at different shafts.

I.e., complex or multilink gears allow getting mechanisms of any complexity with the least amount of kinematic connections. Such gears will be widely used in automatic transmissions, differential gears combined with automatic transmissions, gearboxes combined with freewheel clutches, etc.

BRIEF DESCRIPTION OF THE DRAWINGS AND PREFERRED EMBODIMENTS OF THE INVENTION

The claimed epicyclical gear train is shown in the following Figures.

FIG. 1 is a schematic diagram of the claimed epicyclical gear train with one satellite and one center wheel, geometrically closed eccentric connection, which is made as protruding part A of outer surface of the carrier, conjugated with a slot eccentrically placed on a satellite while detent torque or the torque when the satellite rotation rate is higher than the carrier rotation rate in FIG. 1.1—A-A sectional view in FIG. 1; in FIG. 1.2. design of the epicyclical gear while the torque of braking is presented, in FIG. 1.3.—a schematic diagram of FIG. 1 in perspective geometry (with details spaced-apart) is shown.

Figure 3:
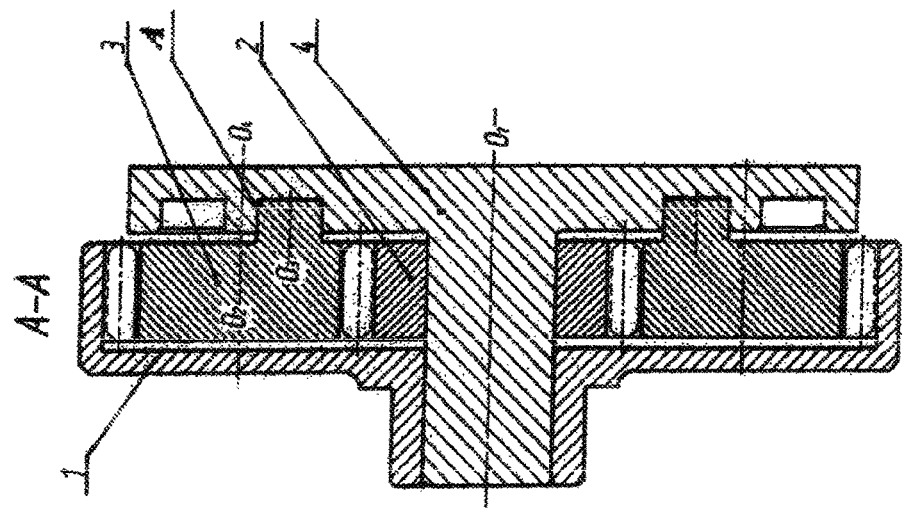
FIG. 3 shows a schematic diagram of the claimed epicyclical gear train variation, made by multiple satellites scheme (three satellites) geometrically closed eccentric connection of which is made as protruding part of outer surface—stud on satellite, conjugated with the slot, made on the carrier.
Figure 3:
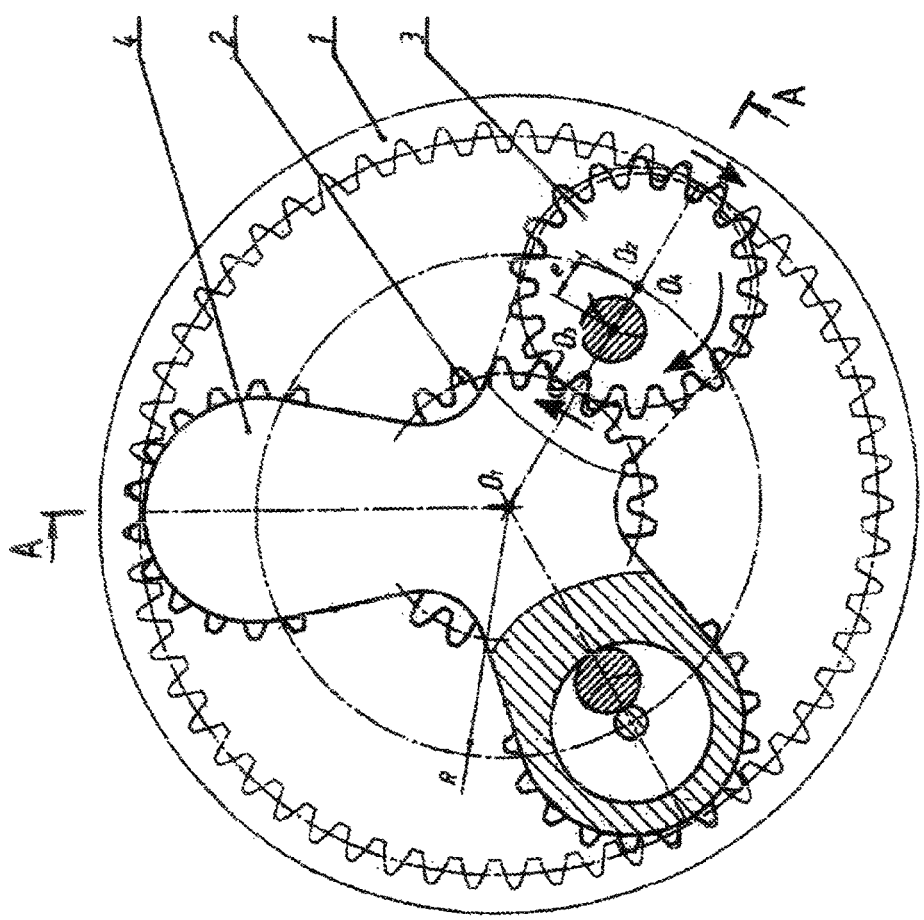
Figure 4:
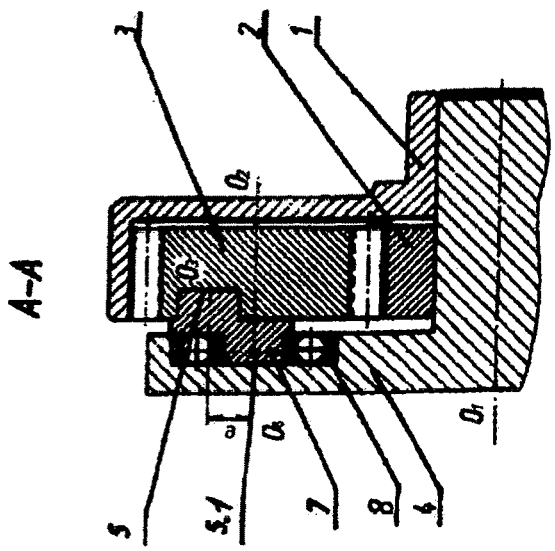
Figure 4:
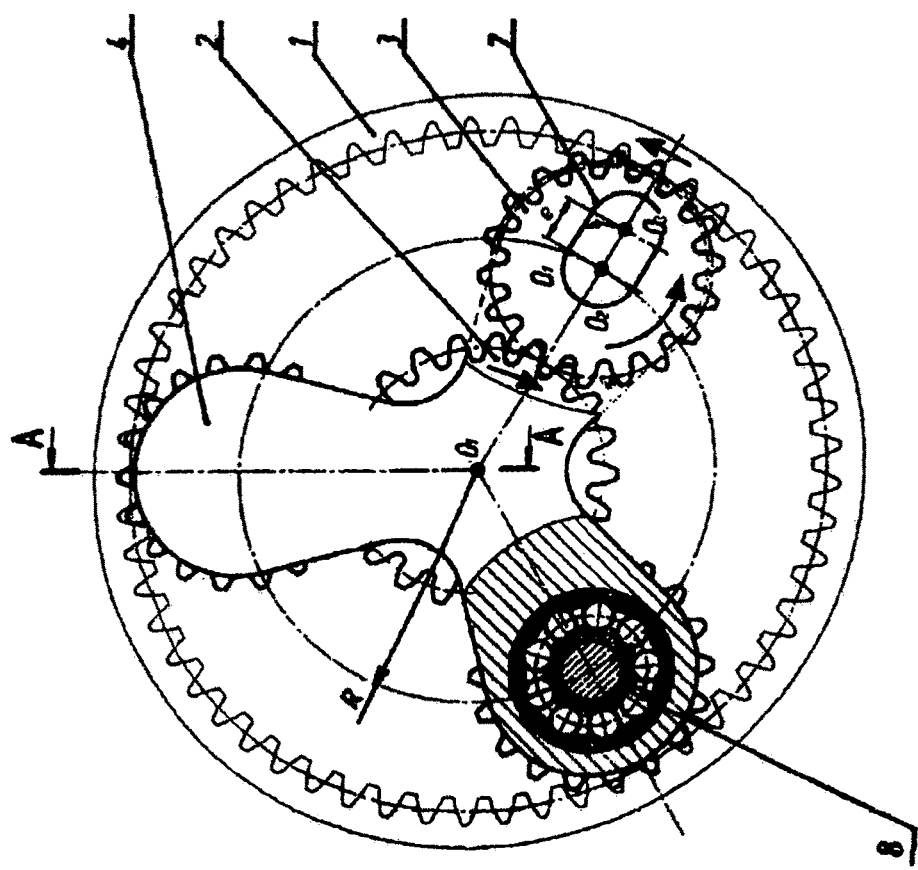

FIG. 3.1. is A-A sectional view in FIG. 3; in FIG. 3.2. the first torque of displacement is shown, in FIG. 3.3. the torque of braking is shown; FIG. 3.4. is perspective geometry (with details spaced-apart) of FIG. 3;

FIG. 4 is a schematic diagram of the claimed epicyclical gear train, geometrically closed eccentric connection of which is made as eccentric element, provided with protruding part of outer surface, placed from its opposite sides eccentrically from each other, conjugated with the carrier and the satellite by holes located on the satellite and the carrier;

FIG. 4.1.—A-A sectional view in FIG. 4; in FIG. 4.2. the first torque of epicyclical gear displacement is shown, in FIG. 4.3. its braking torque is shown; FIG. 4.4. is a kinematic diagram of FIG. 4.

Figure 5:
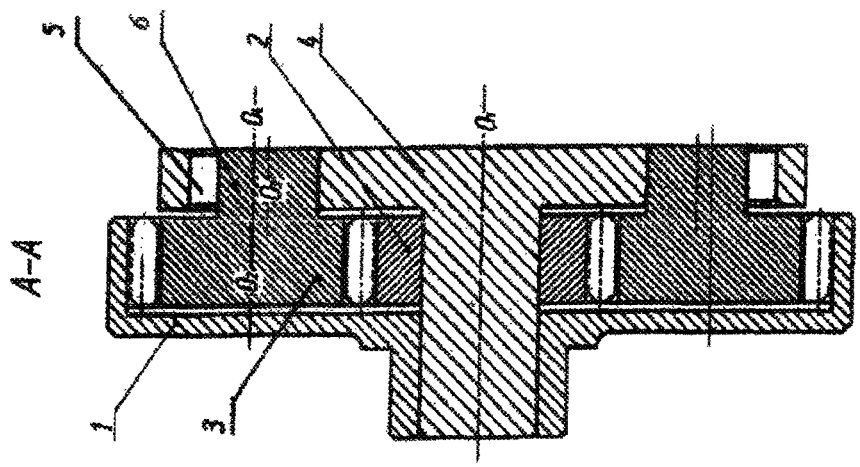
Figure 5:
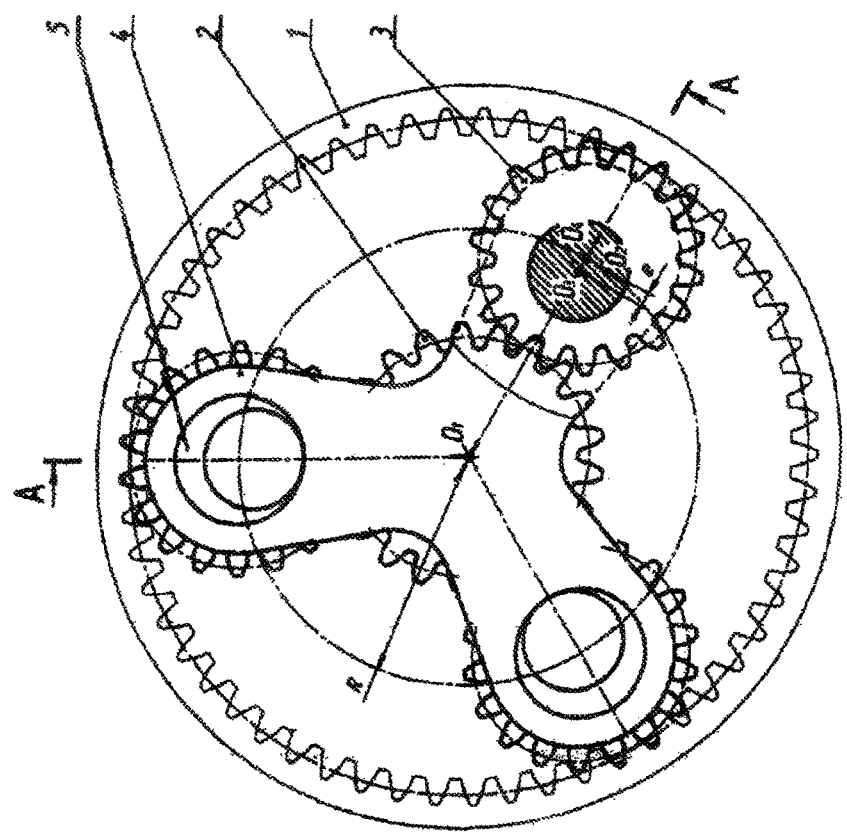

FIGS. 5-5.2. are a simpler diagram of the claimed epicyclical gear implementation, in which the protruding part of the satellites outer surface in the form of an eccentrically placed stud is made together with the satellite (as a whole), conjugated with the hole on the carrier.

Figure 6:
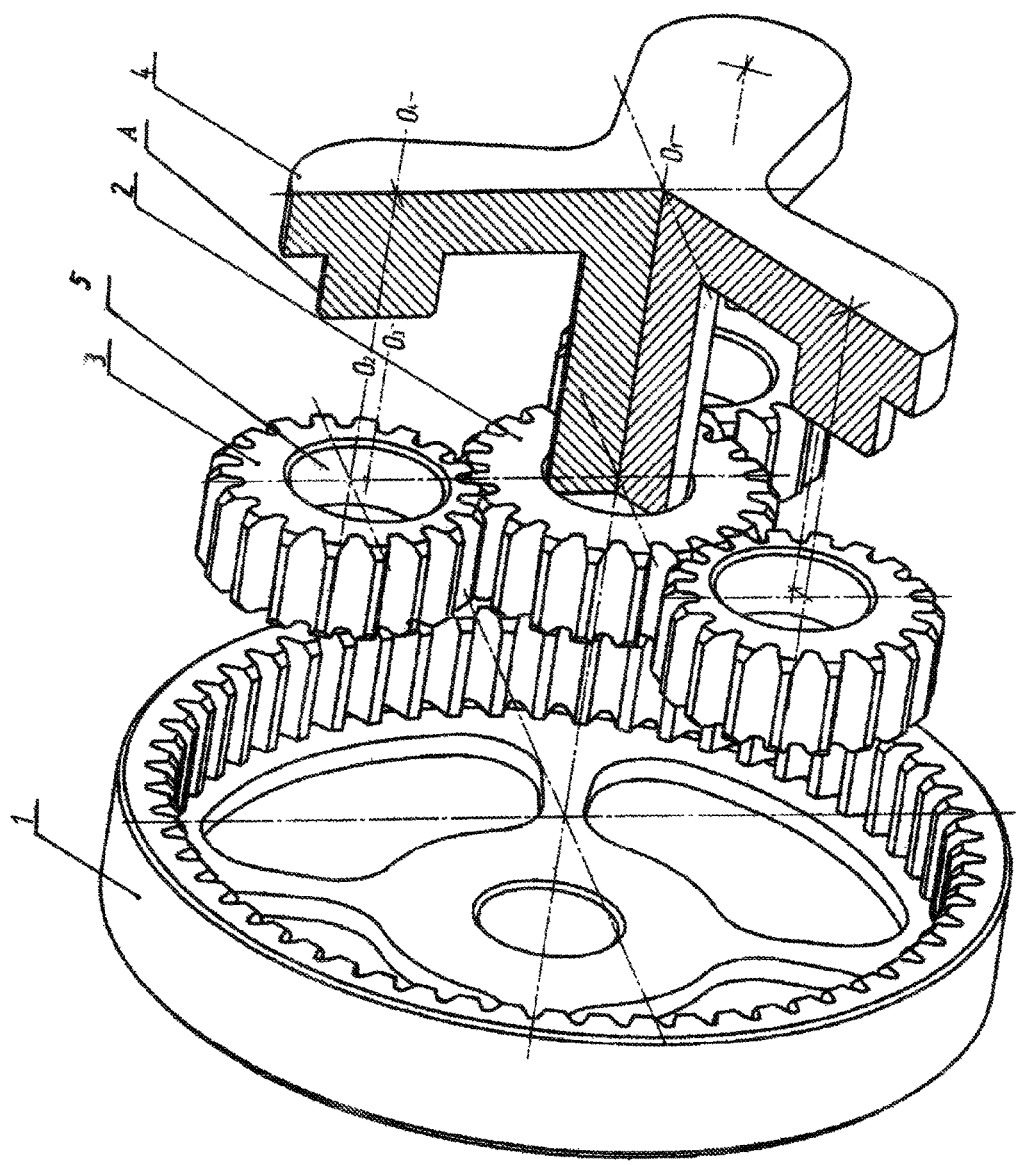

FIG. 6 is a diagram of the epicyclical gear configuration, in which the protruding part of the carrier's outer surface in the form of eccentrically placed stud is made together with the carrier (as a whole), conjugated with the hole on the satellite.

FIGS. 7-7.3 and 8 are variations of epicyclical gear configuration, in which protruding part of geometrically closed eccentric connection is made in the form of several rolling elements.

Figure 9:
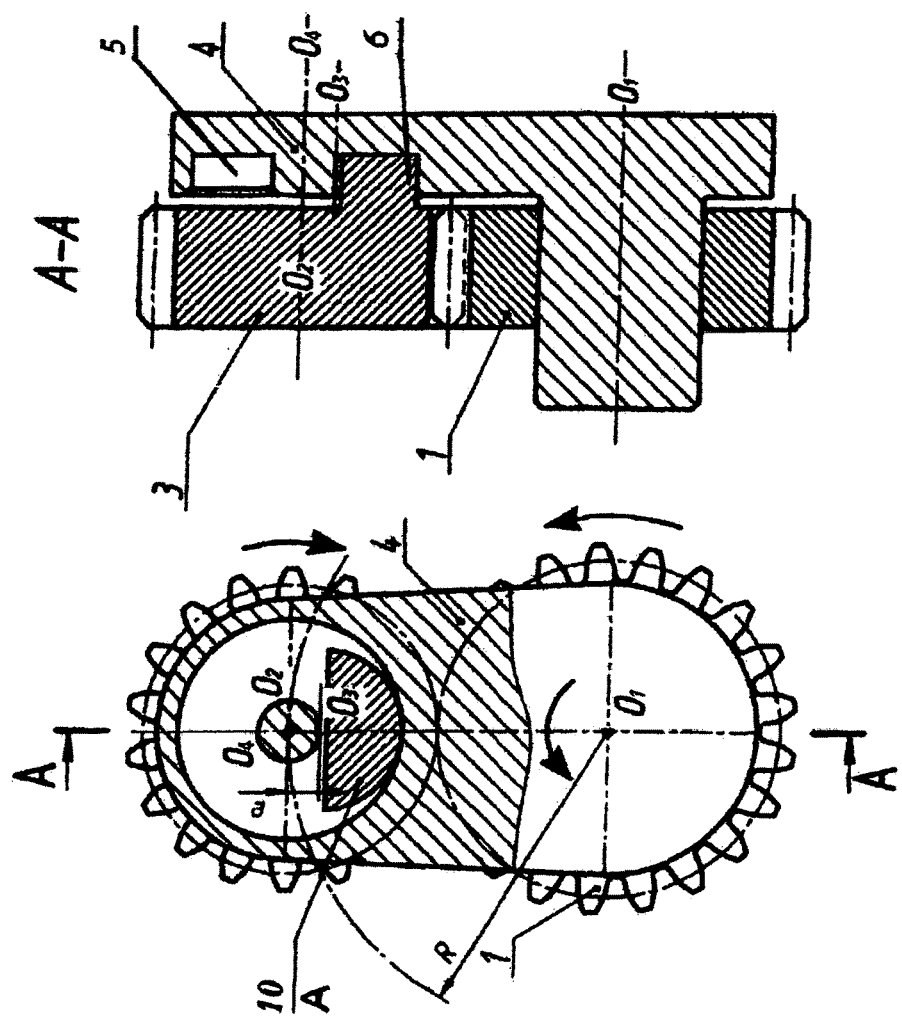

FIG. 9-9.2. are a variation of protruding part of the satellite outer surface in the form of segment and conjugation with it.

Figure 10:
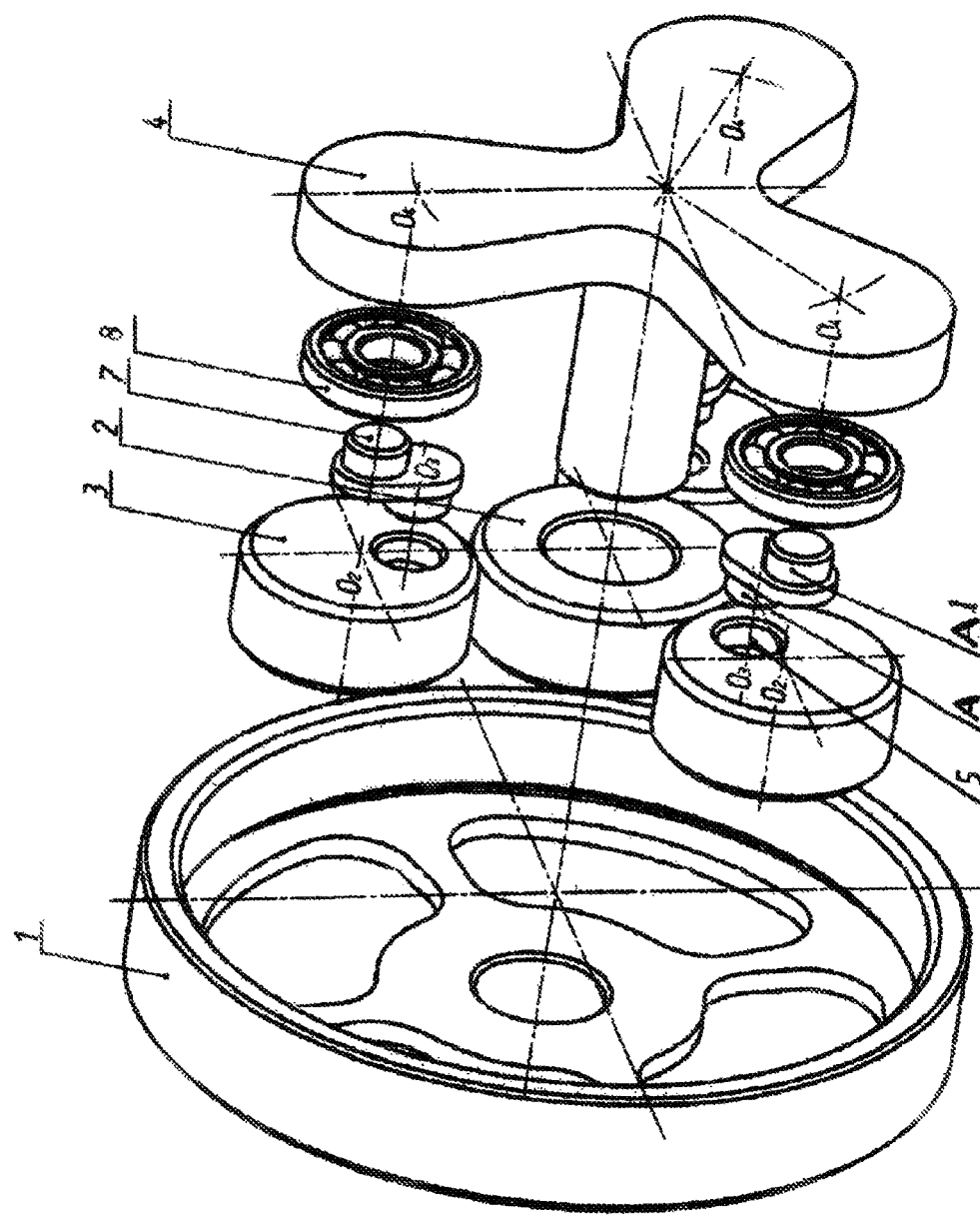
Figure 11:
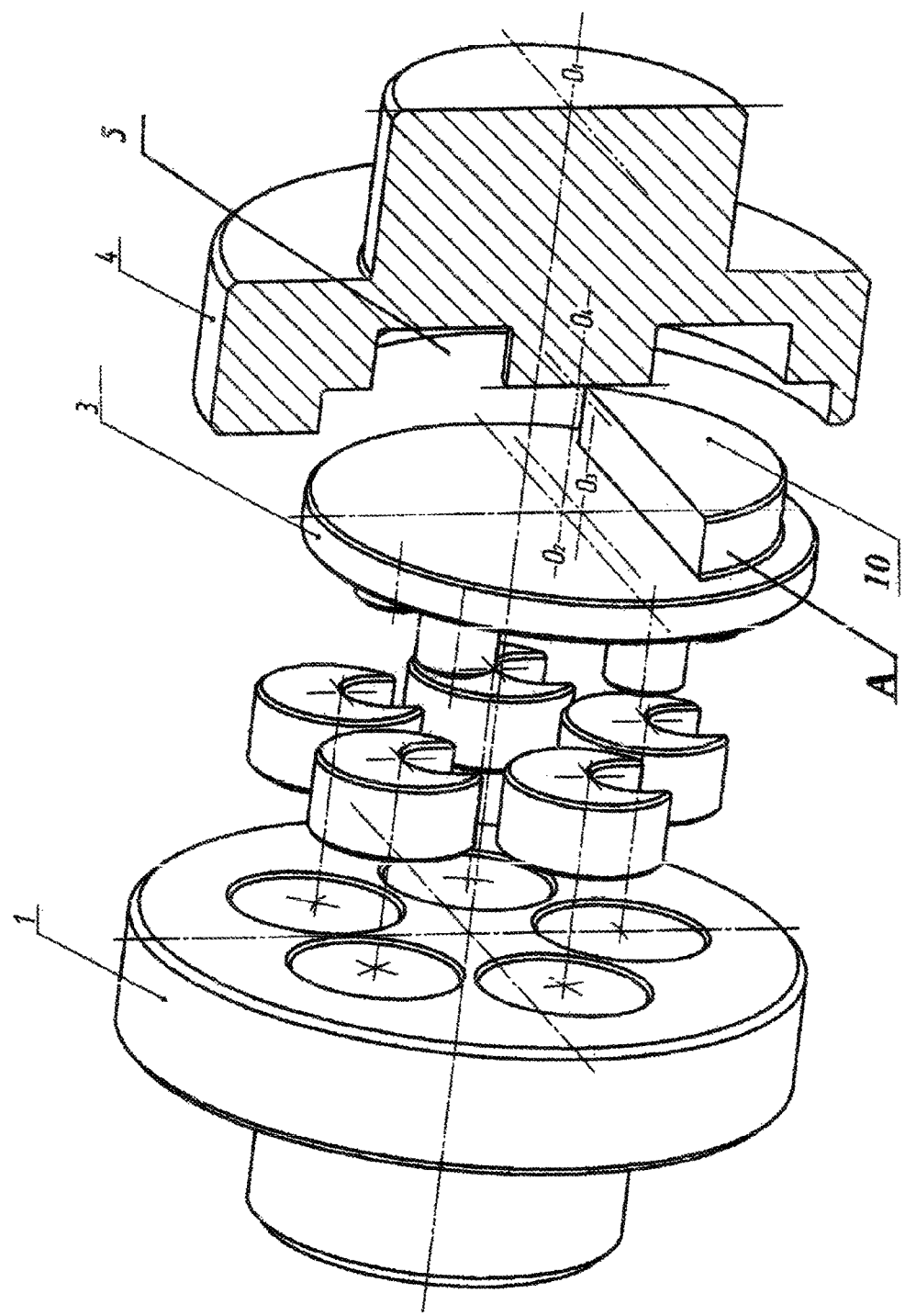

FIG. 10 and FIG. 11 are examples of different rotational gears: friction gear (FIG. 10); pin-gear drive (FIG. 11).

Figure 12:
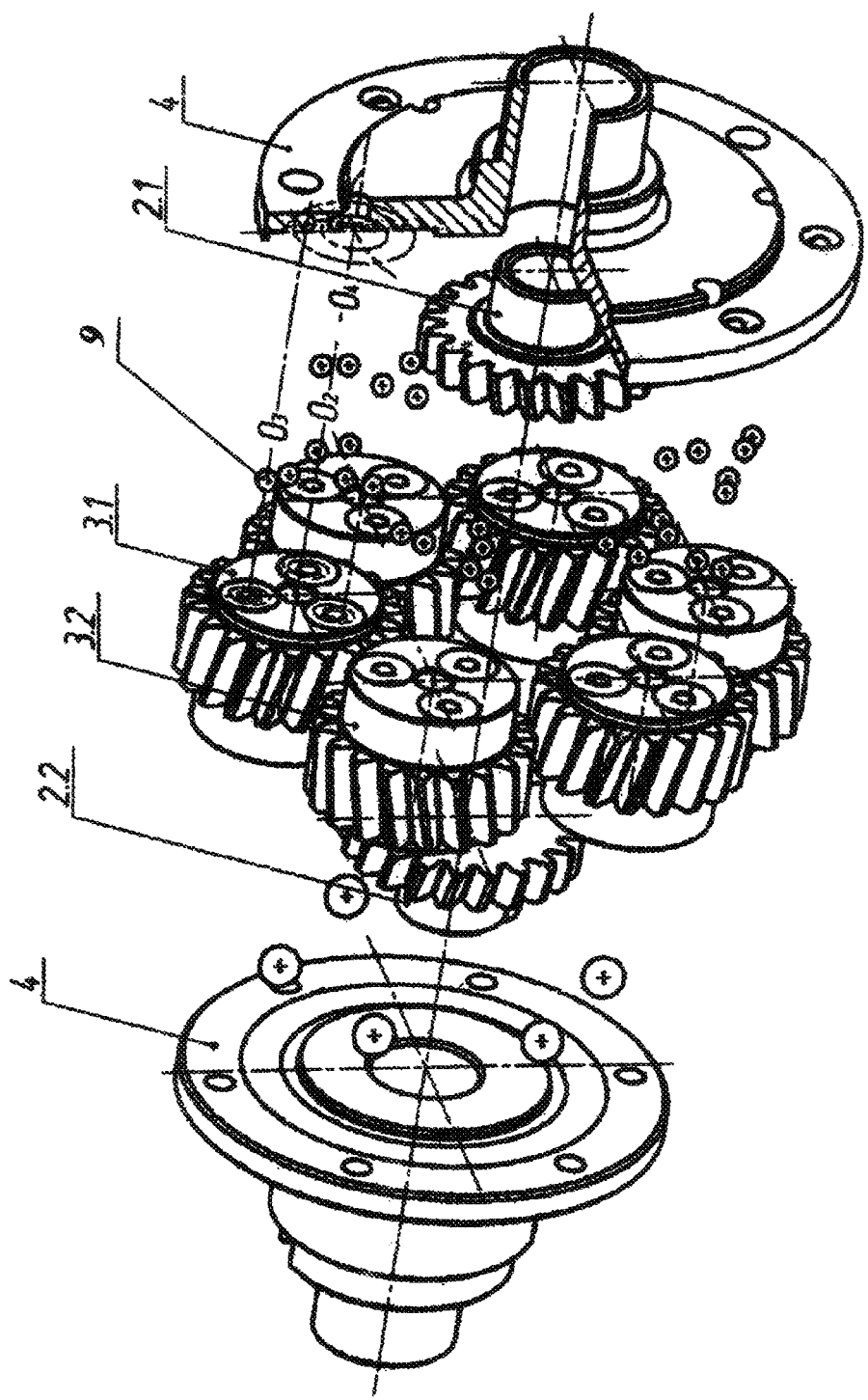
Figure 13:
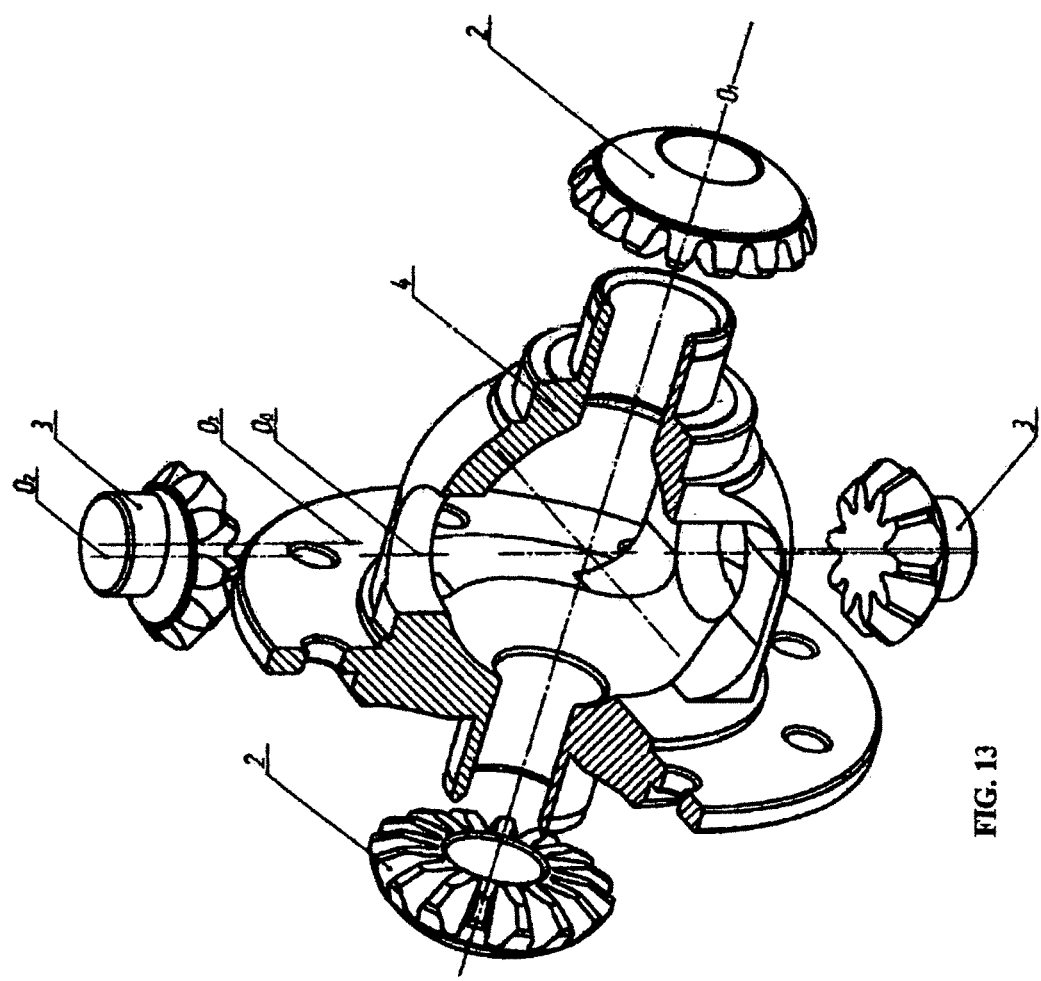

FIG. 12 and FIG. 13 show an example implementation of the epicyclical gear differential.

Figure 14:
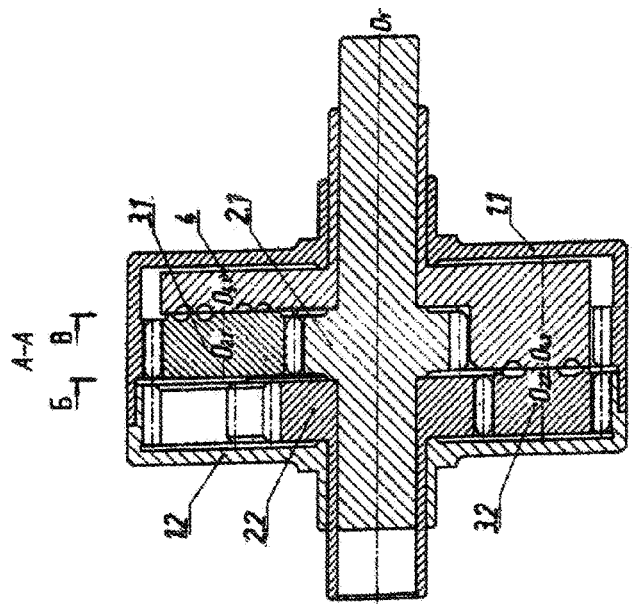
Figure 14:
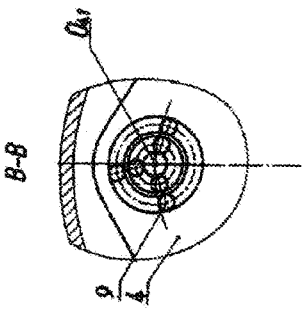
Figure 14:
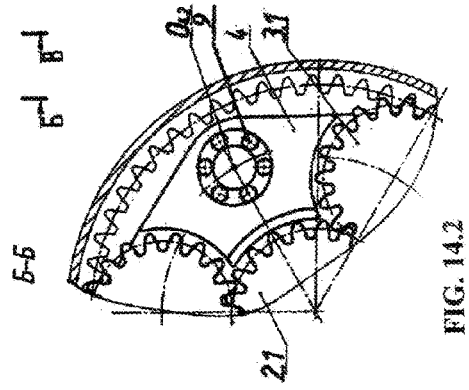
Figure 14:
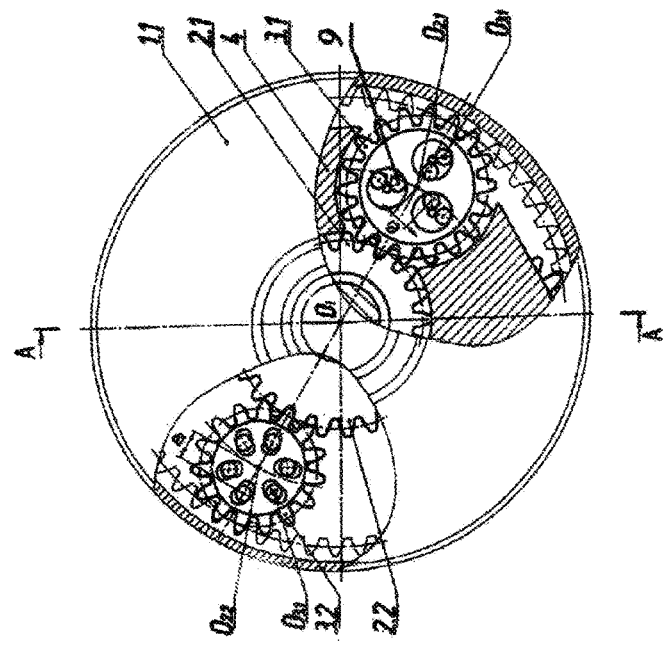

FIG. 14-14.4 present a multilink epicyclical gear, in which the satellites from one planetary gear set are conjugated with the satellites of another planetary gear set by geometrically closed eccentric connection in the form of rotation elements, in these drawings, the direct conjugation of satellites is shown.

Figure 15:
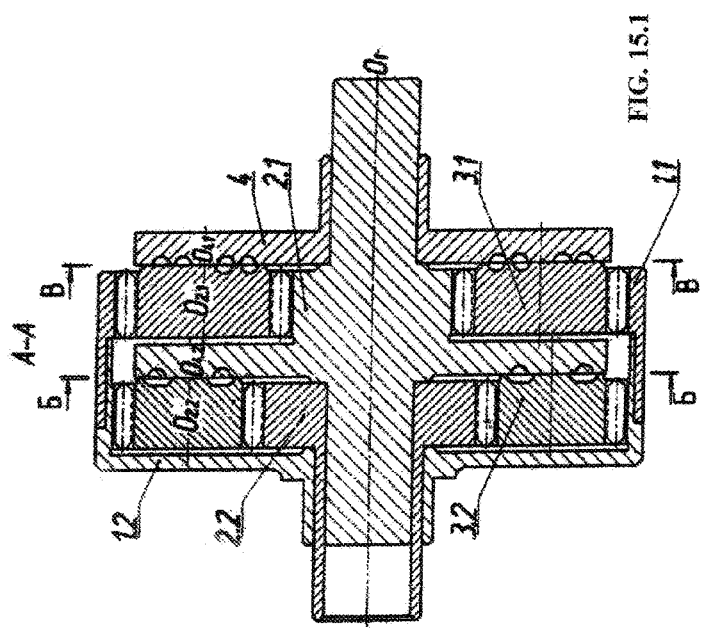
Figure 15:
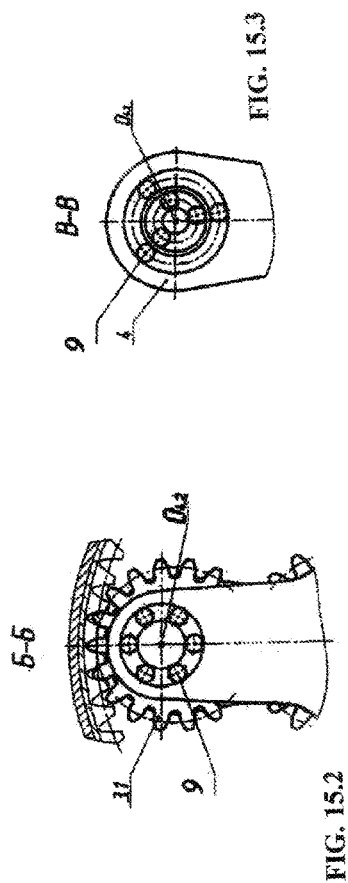
Figure 15:
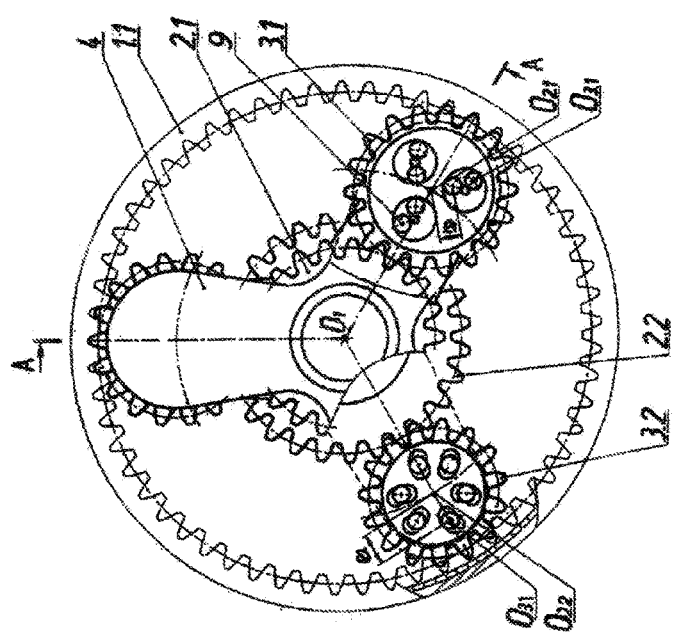

FIG. 15-15.4 present a multilink epicyclical gear, in which the satellites from one planetary gear set are conjugated with the center wheel of the other planetary gear set by geometrically closed eccentric connection made in the form of rotation elements.

Figure 16:
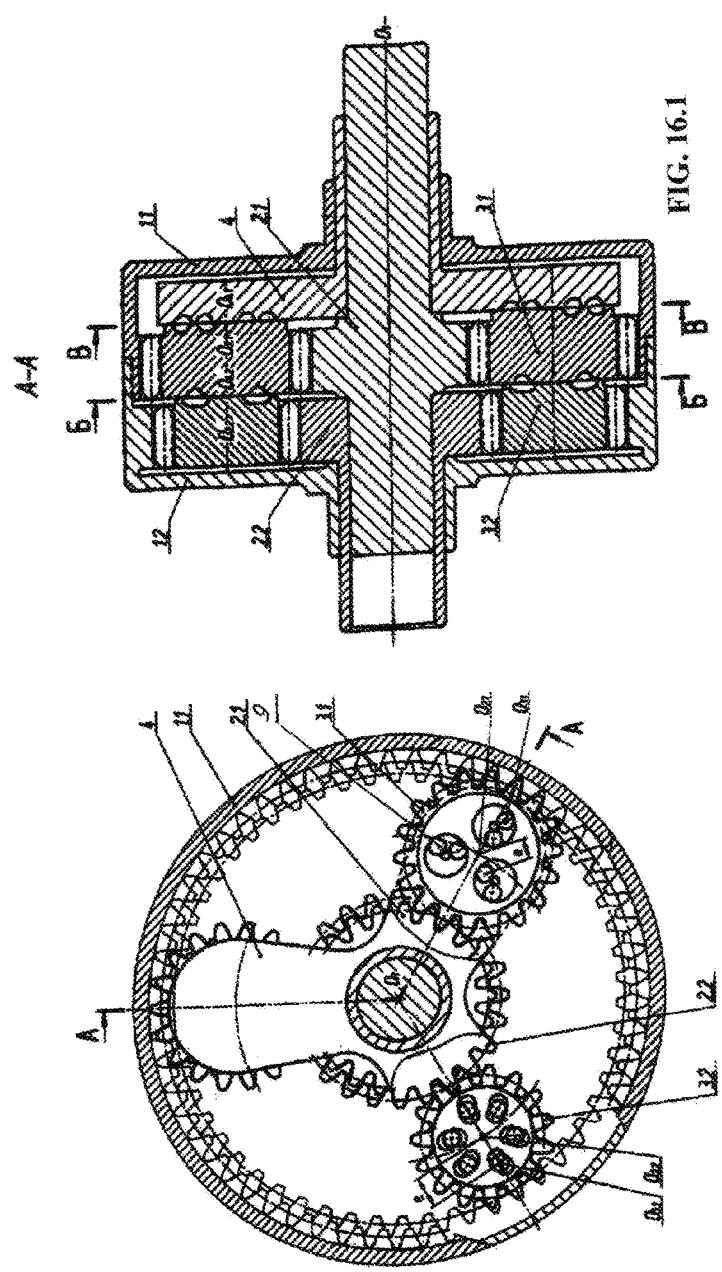

FIG. 16-16.4 present a multilink epicyclical gear, in which the satellites of different planetary gear sets are conjugated with a carrier by geometrically enclosed eccentric connections, made in the form of rotation elements.

VARIATIONS OF INVENTION'S IMPLEMENTATIONS

Figure 1:
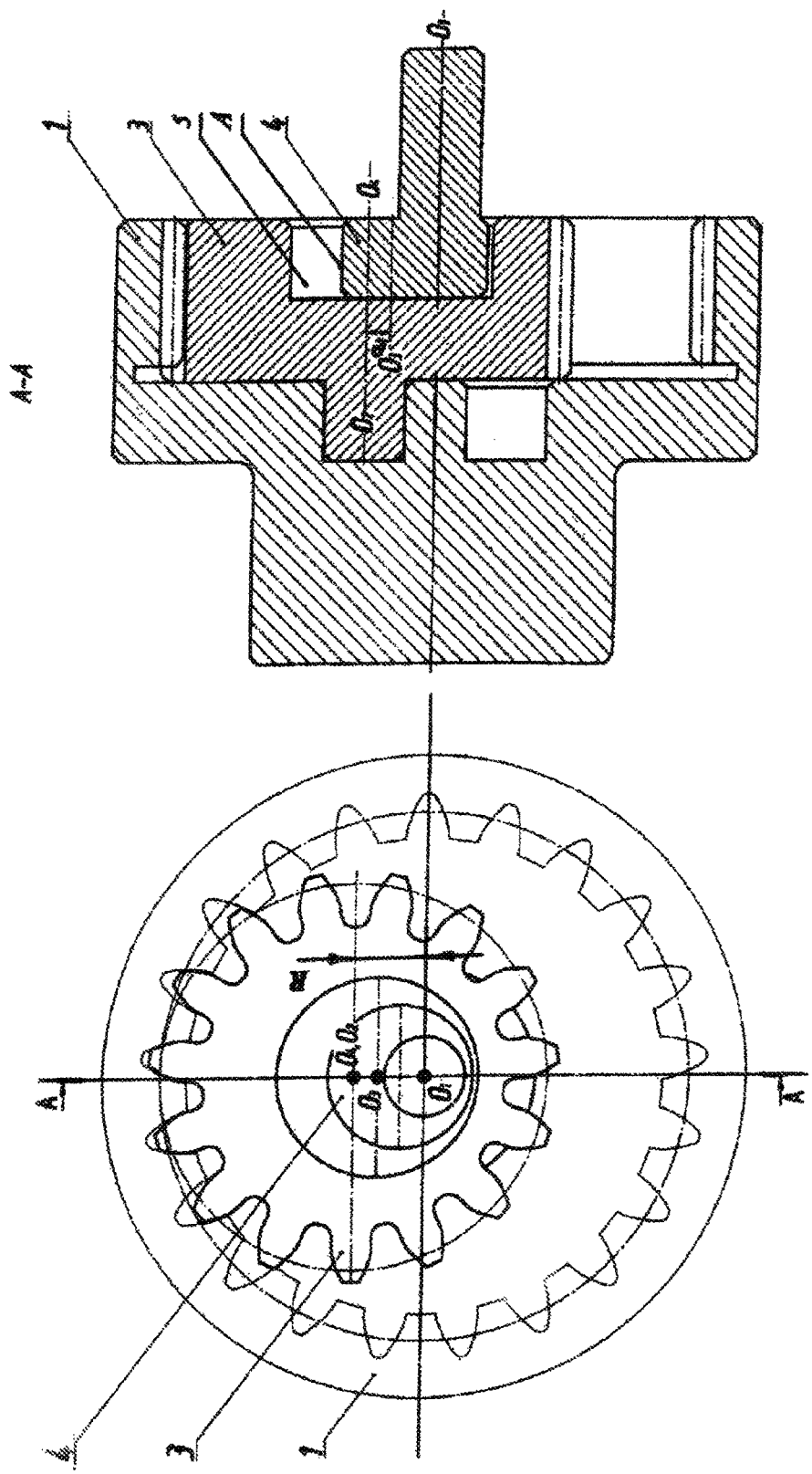

The epicyclical gear train, presented in FIG. 1, has one center wheel 1, one satellite 3, and the carrier 4. The center wheel 1 and the carrier 4 are placed on geometrical gear axis O1. Center wheel 1 makes with satellite 3 a rotation gear (in this case, toothed one). Satellite 3 rotates freely on its geometrical axis O2 and is conjugated with the carrier 4 by geometrically closed eccentric connection, which is in this case made as protruding part A of the carrier 4 outer surface, conjugated with the slot 5 eccentrically placed on the satellite 3 (ref. FIG. 1-1.3).

This conjugation of the satellite 3 and the carrier 4 makes a kinematic pair. The protruding part A of the carrier 4 outer surface is made in such a way that allows the displacement of the rotation axis 02 of the satellite 3 relative to the carrier 4. The rotation axis O2 of the satellite 3 is located at a permanent distance R from the gear axis O1. The protruding part A of the carrier 4 outer surface and eccentrically placed slot 5 made on the satellite 3 provides the possibility of epicyclical gear braking. In this case, the planetary gear braking is carried out by braking of the satellite 3, which is conjugated with the carrier 4 in this conjugation. The braking of the satellite 3 with the braking of the epicyclical gear is provided by the rotation axis 02 displacement of the satellite 3 relatively to the carrier 4 in the circumferential or tangential directions.

The conjugation between the satellite 3 and the carrier 4 by geometrically closed eccentric connection, made in the form of the protruding part A of the carrier 4 outer surface, and an eccentric located on the satellite 3 of the slot 5 has at least one, located on the carrier 4, basic geometrical axis O4, also located at a permanent distance R from the geometric gear axis O1. When the rotational rate of the satellite 3 is higher than the rotation rate of the carrier 4 constructively epicyclical gear seeks to combine the satellite 3 rotation axis O2 with at least one basic geometrical axis O4, located on the carrier 4, said basic geometrical axis O4 becomes additional rotation axis for the satellite 3. The protruding part A of the carrier 4 outer surface put in the slot 5, located on the satellite 3, with the possibility of its rotation or rotation relatively to the geometrical axis O3. Axis O3 is placed with eccentricity "e" relatively to the satellite 3 rotation axis O2. The magnitude of the eccentricity "e" influences the technical characteristics of the epicyclical gear. Axis O3 permits the displacement of the satellite 3 rotation axis O2 relatively to the carrier 4, which is carried out in the circumferential or tangential directions.

Actually torque gear is going through axis O3. The location of the axes O2, O3 and basic geometrical axis O4 located on the carrier 4 in the epicyclical gear is designed in such a way that while coincidence (alignment) of basic geometrical axis O4 with the satellite 3 rotation axis O2, the satellite 3 begins to rotate freely on the basic geometric rotation axis O4. The displacement of the satellite 3 rotation axis O2 relatively to the basic geometric axis O4 makes the satellite 3 brake, which leads to the epicyclical gear braking.

Satellite 3 resists to a radial displacement by the center wheel 1, or by the claimed eccentric connection, specifically, in this case, by the protruding part A of the outer surface of carrier 4 or by other known means.

The epicyclical gear works as follows. As torque is applied to the carrier 4 in any direction (see FIG. 1) the carrier 4 starts to rotate relatively to the gear axis O1. The protruding part of the carrier 4 outer surface A is shifted (rotated) to the eccentric slot 5 in the satellite 3, and at least one basic geometrical axis O4, located on the carrier 4, is displaced relatively to the satellite 3 rotation axis O2, which in fact loses the possibility of free rotation as with its body satellite 3 begins to bump into the carrier 4 body. The satellite 3 braking happens (FIG. 1.2).

The epicyclical gear begins to rotate as a whole system. This happens while satellite 3 rotation rate is lower than the carrier 4 rotation rate. Provided that when the satellite 3 rotation rate becomes higher than the carrier rotation rate for any reason, the satellite 3 (while turning) combines its rotation axis O2 with at least one basic geometrical axis O4, which is located on the carrier 4, satellite 3 gains the ability to rotate freely. Epicyclical gear begins to transmit the rotation like a regular epicyclical gear.

Design and the operating principle of all the claimed epicyclical gear variations presented in the Figures do not extend beyond the scope, design and operation of the device variation described above and shown in FIG. 1-1.3, but have some peculiar features.

Figure 2:
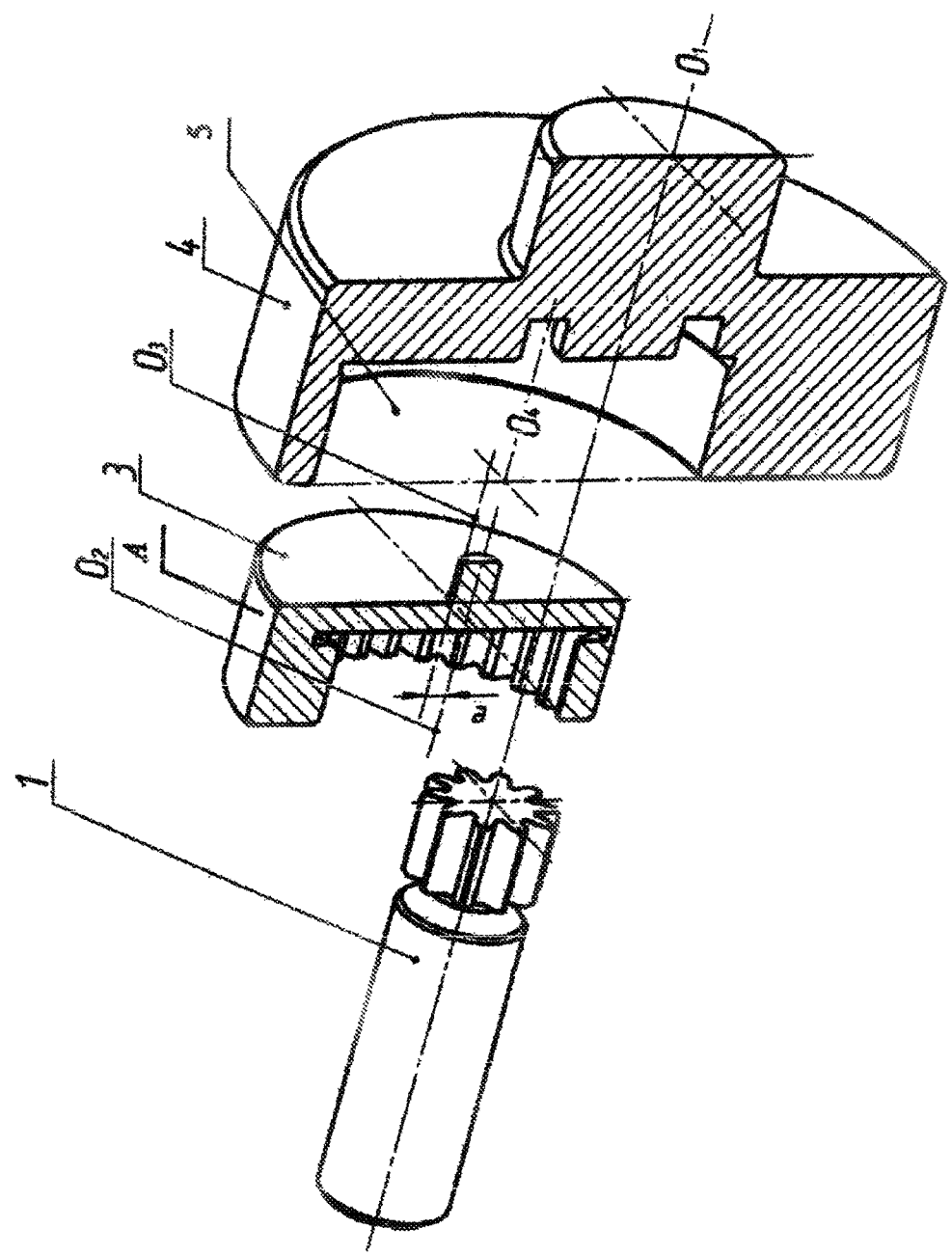
FIG. 2 is a variation of epicyclical gear which is similar to one in FIG. 1, geometrically closed eccentric connection of which is made as protruding part A of outer surface of a satellite conjugated with a slot eccentrically placed on the carrier (in perspective geometry with details spaced-apart)

So on the claimed epicyclical gear variation shown in FIG. 2, geometrically closed eccentric connection is made in the form of protruding part A of the satellite 3 outer surface, which is conjugated with the slot 5 eccentrically located on the carrier 4 in perspective geometry with details spaced-apart.

And the schematic diagram of the claimed multiple-satellite epicyclical gear variation, shown in FIG. 3, presents a retaining torque, or when the rotational rate of carrier 4 is lower than the rotation rate of satellite 3, a displacement is absent (angle φ=0).

The epicyclical gear works like a regular planetary device. FIG. 3.2. (interposition) shows the beginning of the carrier's 4 displacement relatively to the satellite's 3 rotation axis. The braking torque in FIG. 3.3 clearly shows how the eccentric connection in the form of protruding part on the outer surface (stud A on the satellite 3) brakes it.

Number 2 in FIGS. 3-8 and 10, 12-16.4 indicates the second center wheel. FIGS. 5-5.2 present an eccentric connection, made in the form of protruding part A on the satellite's 3 outer surface, which appears as stud 6.

FIGS. 4 and 10 show the eccentric connection made in the form of an eccentric element 7, equipped with a protruding part of the outer surfaces A and A.1, located on its opposite sides eccentrically to each other, conjugated with the carrier 4 and the satellite 3 by holes (slots) 5 and 5.1 (holes/slots) on the carrier 4 (in FIG. 10 they aren't shown) located on the satellite 3 and the carrier 4, and number 8 indicates a bearing.

Figure 8:
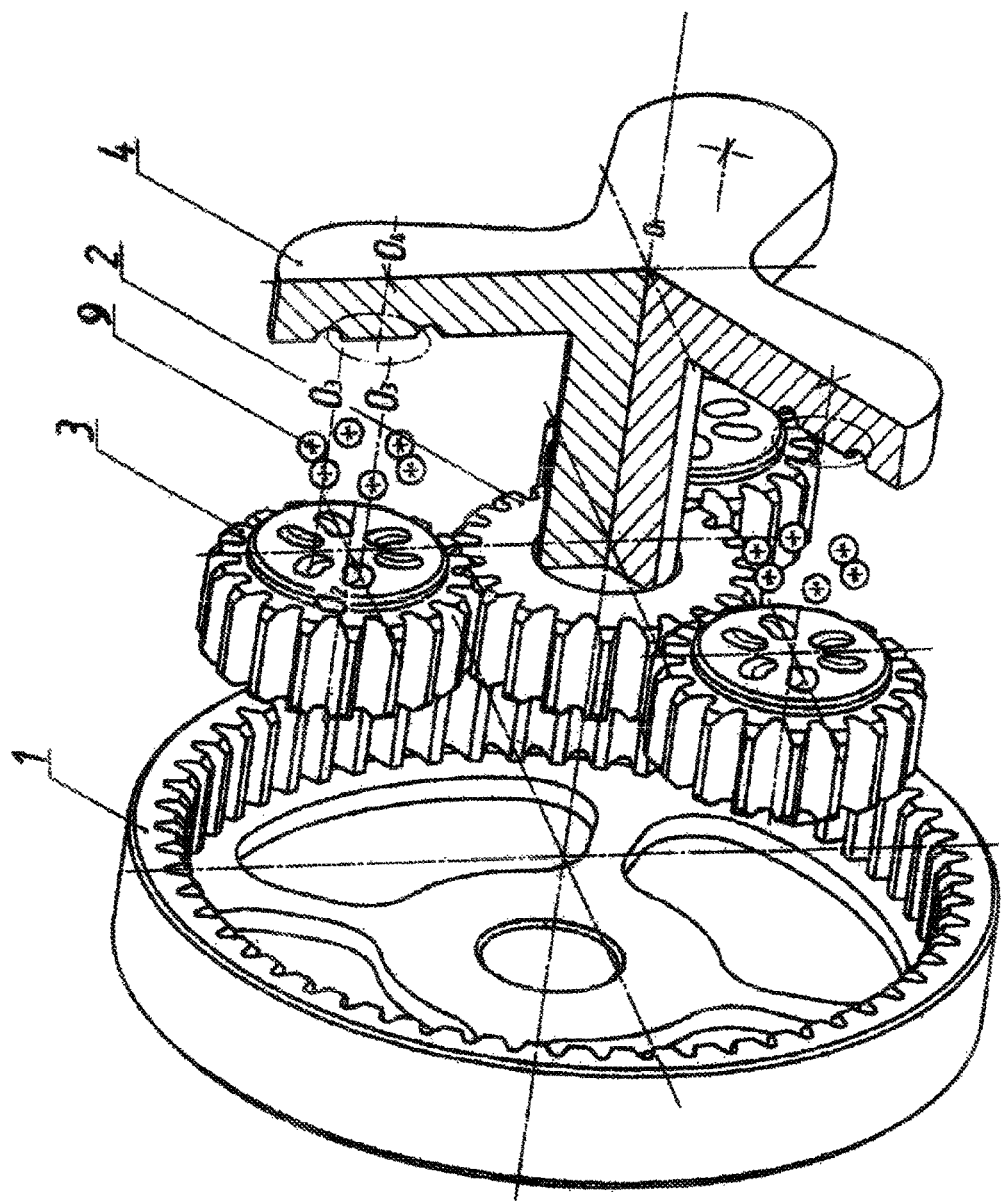

In the FIGS. 7-8, the eccentric element is in the form of rolling balls 9 (rolling/rotation elements); FIGS. 9-9.2 and 11 present the eccentric element in the form of segment 10.

The cross section of geometrically closed eccentric connection, which is made in the form of the protruding part of the outer surface, which is a stud 6 on the satellite (FIG. 3-3.3), or the carrier (FIG. 6), or the protruding parts of the eccentric element 7 (FIG. 4-4.4), may have different configurations: round, oval, wavy configuration, a triangle or any other polygon, etc.

Design of the epicyclical shown in FIG. 14-14.4 can be supplemented by spacers, e.g. in the form of separators or other mechanisms (not shown), which ensure the alignment of satellites.

In the epicyclical gear with conjugation of at least one center wheel 1, with at least one satellite 3, any known rotational gear, toothed, belt, pin-gear (FIG. 11), cycloid, chain, friction (FIG. 10), hinged lever gear, and others can be used.

The claimed invention is not limited by these configurations. The constituent elements may be replaced by known means, preserving the identity of the invention (FIGS. 12, 13, 16-15.4, 16-16.4). Moreover, various modifications presented in the implementation variations, can be appropriately connected by methods, known to a person skilled in the art of invention.

INDUSTRIAL APPLICABILITY

The invention can be used in transmissions of different vehicles in the industry. The device, according to the present invention, can be manufactured and assembled at factories having necessary metal-processing equipment, as well as factories, which assemble devices from components and have necessary equipment to assemble them and qualified specialists in the field of assembly.

The invention claimed is:

1. A planetary gear train defining a gear axis thereof, said planetary gear train comprising:
    at least one center wheel rotating about the gear axis;
    at least one satellite defining a satellite axis thereof, wherein the satellite axis is spaced apart from the gear axis; said at least one satellite freely rotates about the satellite axis; said at least one satellite provides a transmission of rotational movement to said least one center wheel; said satellite has a slot eccentrically made therein; and
    a planetary carrier rotating about the gear axis, and having an outer surface including a protruding part thereof; wherein:
    said at least one satellite is coupled with the planetary carrier by means of conjugating said slot with said protruding part, thereby creating a geometrically closed eccentric connection providing for displacement of the planetary carrier relatively to the satellite axis, and causing a detent torque.

2. A planetary gear train defining a gear axis thereof, said planetary gear train comprising:
    at least one center wheel rotating about the gear axis;
    at least one satellite defining a satellite axis thereof, wherein the satellite axis is spaced apart from the gear axis; said at least one satellite freely rotates about the satellite axis; said at least one satellite provides a transmission of rotational movement to said least one center wheel; said at least one satellite has an outer surface including a protruding part thereof; and
    a planetary carrier rotating about the gear axis, and having a slot eccentrically made therein; wherein:
    said at least one satellite is coupled with the planetary carrier by means of conjugating said slot with said protruding part, thereby creating a geometrically closed eccentric connection providing for displacement of the planetary carrier relatively to the satellite axis, and causing a detent torque.

3. A planetary gear train defining a gear axis thereof, said planetary gear train comprising:
    at least one center wheel rotating about the gear axis;
    at least one satellite defining a satellite axis thereof, wherein the satellite axis is spaced apart from the gear axis; said at least one satellite freely rotates about the satellite axis; said at least one satellite provides a transmission of rotational movement to said at least one center wheel; said at least one satellite either has an outer surface furnished with a satellite protruding part, or said at least one satellite has a satellite slot made therein;
    a planetary carrier rotating about the gear axis; said planetary carrier either has a at least one carrier slot made therein, or said planetary carrier has a surface furnished with at least one carrier protruding part; and
    at least one eccentric element having two opposite surfaces each furnished either with an eccentric protruding part eccentrically positioned thereon, or with an eccentric slot eccentrically made therein;
    wherein said at least one satellite is coupled with said planetary carrier by means of said at least one eccentric element; and wherein:
    either each said satellite protruding part is conjugated with the corresponding eccentric slot, and said carrier protruding part is conjugated with the corresponding eccentric slot; or each said satellite slot is conjugated with the corresponding eccentric protruding part, and said carrier slot is conjugated with the corresponding eccentric protruding part;
    thereby creating a geometrically closed eccentric connection providing for displacement of the planetary carrier relatively to the satellite axis, and causing a detent torque.

* * * * *